(12) United States Patent
Kettlgruber et al.

(10) Patent No.: US 12,129,114 B2
(45) Date of Patent: Oct. 29, 2024

(54) STORAGE AND PICKING SYSTEM HAVING IMPROVED STOCKING PERFORMANCE AND METHOD FOR OPERATING SAME

(71) Applicant: TGW Logistics Group GmbH, Marchtrenk (AT)

(72) Inventors: Gerald Kettlgruber, Linz (AT); Timothy Lindley, Schwerte (DE); Philipp Johann Kolmhofer, Leonding (AT); Marta Barberá Mateo, Cornellá de Llobregat (ES); Harald Johannes Schroepf, Wels (AT)

(73) Assignee: TGW Logistics Group GmbH, Marchtrenk (AT)

( * ) Notice: Subject to any disclaimer, the term of this patent is extended or adjusted under 35 U.S.C. 154(b) by 663 days.

(21) Appl. No.: 17/422,292

(22) PCT Filed: Feb. 10, 2020

(86) PCT No.: PCT/AT2020/060038
§ 371 (c)(1),
(2) Date: Jul. 12, 2021

(87) PCT Pub. No.: WO2020/163885
PCT Pub. Date: Aug. 20, 2020

(65) Prior Publication Data
US 2022/0089368 A1    Mar. 24, 2022

(30) Foreign Application Priority Data

Feb. 11, 2019 (AT) .............................. A 50102/2019
Feb. 19, 2019 (AT) .............................. A 50124/2019

(51) Int. Cl.
*B65G 1/04* (2006.01)
*B65G 1/06* (2006.01)

(52) U.S. Cl.
CPC ........... *B65G 1/0457* (2013.01); *B65G 1/065* (2013.01)

(58) Field of Classification Search
CPC .. B65G 1/0457; B65G 1/0407; B65G 1/1378; B65G 17/485; B65G 17/20; B65G 17/00; B65G 2201/0238; B65G 19/025
See application file for complete search history.

(56) References Cited

U.S. PATENT DOCUMENTS

| 4,183,427 A | 1/1980 | Tomikawa |
| 5,971,131 A | 10/1999 | Blattner et al. |

(Continued)

FOREIGN PATENT DOCUMENTS

| AT | 520517 A4 | 5/2019 |
| AT | 521961 A4 | 7/2020 |

(Continued)

OTHER PUBLICATIONS

International Search Report in PCT/AT2020/060038, mailed Jun. 18, 2020.

(Continued)

*Primary Examiner* — Timothy R Waggoner
(74) *Attorney, Agent, or Firm* — Collard & Roe, P.C.

(57) ABSTRACT

The invention relates to a storage and order-picking system as well as a method for operating the same. In this regard, provided articles are loaded into hanging bags in an article-specific manner, and subsequently, groups of hanging bags are formed in a hanging bag sorting device based on an article-grouping rule. In a further step, articles of a group are transferred from the hanging bags into an article storage loading aid. The article storage loading aid configured differently from a hanging bag is then stored in an article storage of the storage and order-picking system. Upon receiving a picking order, the article storage loading aid is (Continued)

Figure 1:
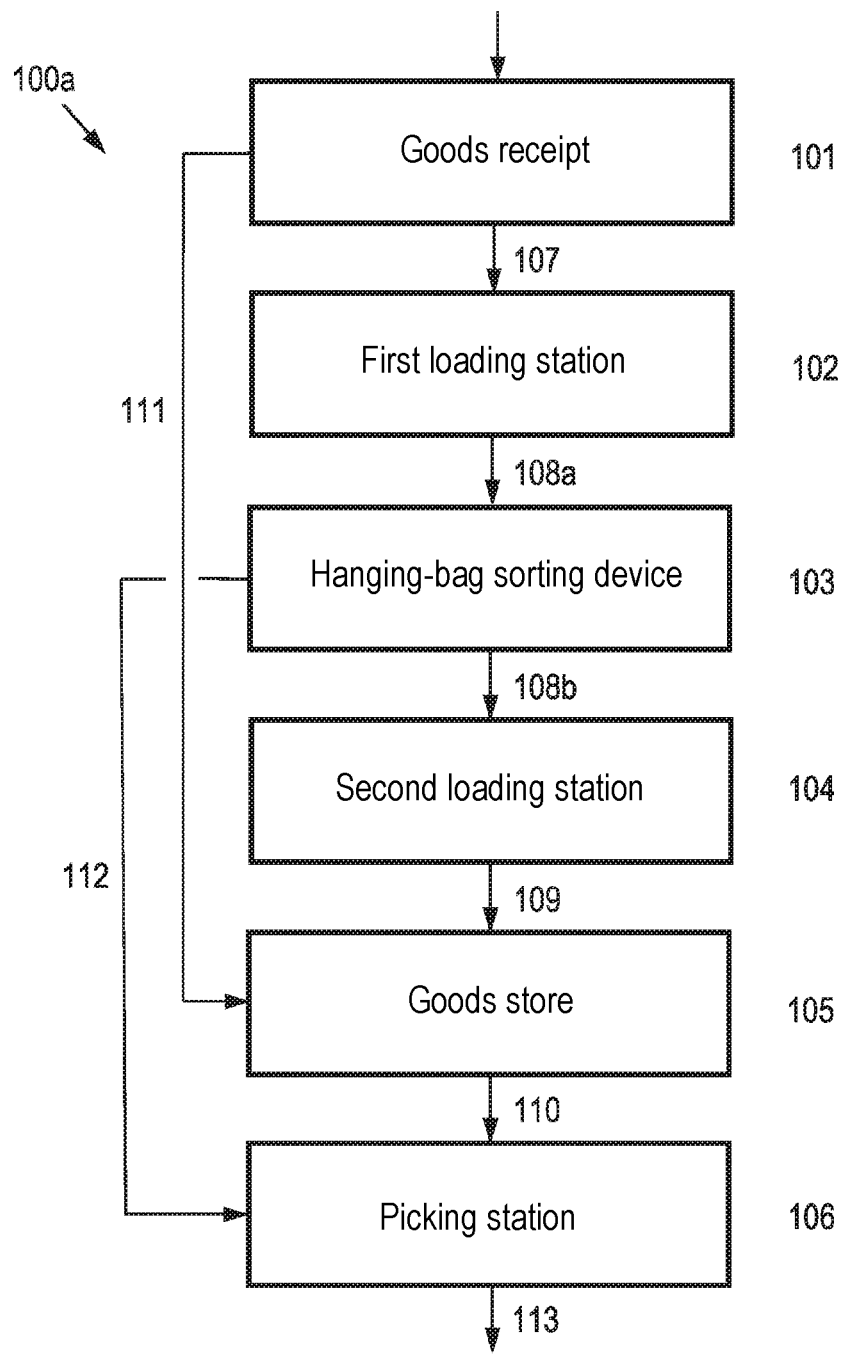

transported to a picking station, at which the ordered article(s) is/are loaded into a target loading aid.

17 Claims, 9 Drawing Sheets

(56) References Cited

U.S. PATENT DOCUMENTS

| | | | |
|---|---|---|---|
| 6,170,642 B1 | 1/2001 | Galan et al. | |
| 9,452,893 B1 | 9/2016 | Fujihara et al. | |
| 9,741,009 B2 | 8/2017 | Berghorn et al. | |
| 9,771,217 B2 | 9/2017 | Lert et al. | |
| 9,828,187 B2 | 11/2017 | Chierego et al. | |
| 10,252,861 B2 | 4/2019 | Mathi et al. | |
| 10,427,873 B1* | 10/2019 | Mause | B65G 1/1378 |
| 10,538,395 B2 | 1/2020 | Schneuing et al. | |
| 10,710,802 B2 | 7/2020 | Grosse et al. | |
| 10,934,102 B2 | 3/2021 | Sigrist et al. | |
| 11,453,555 B2* | 9/2022 | Lindley | B65G 1/1378 |
| 11,453,557 B2 | 9/2022 | Schnadwinkel et al. | |
| 11,866,254 B2* | 1/2024 | Reischl | B65G 17/32 |
| 11,912,504 B2* | 2/2024 | Lindley | B65B 35/50 |
| 2002/0175041 A1 | 11/2002 | Moshgbar | |
| 2012/0213617 A1 | 8/2012 | Winkler | |
| 2018/0241303 A1* | 8/2018 | Rivera | H02M 1/36 |
| 2019/0177086 A1* | 6/2019 | Mathi | B65G 1/10 |
| 2020/0024074 A1 | 1/2020 | Herzog-Lang et al. | |
| 2020/0189846 A1 | 6/2020 | Sutter | |
| 2020/0269432 A1 | 8/2020 | Beinhofer et al. | |
| 2021/0155415 A1 | 5/2021 | Reischl et al. | |

FOREIGN PATENT DOCUMENTS

| | | |
|---|---|---|
| AT | 522067 A4 | 8/2020 |
| CN | 102725213 A | 10/2012 |
| CN | 105579370 A | 5/2016 |
| CN | 105873838 A | 8/2016 |
| CN | 106144554 A | 11/2016 |
| DE | 19536313 A1 | 4/1997 |
| DE | 20103664 U1 | 6/2001 |
| DE | 10 2012 101 198 A1 | 4/2013 |
| DE | 10 2014 203 298 A1 | 8/2015 |
| DE | 20 2017 106 993 U1 | 12/2017 |
| DE | 20 2017 100 206 U1 | 4/2018 |
| DE | 10 2017 117 713 A1 | 2/2019 |
| DE | 10 2018 219 583 A1 | 5/2020 |
| EP | 1 972 577 A1 | 9/2008 |
| EP | 2 467 319 B1 | 6/2012 |
| EP | 2 581 329 A1 | 4/2013 |
| EP | 3 110 725 B1 | 10/2018 |
| EP | 3 653 539 A1 | 5/2020 |
| EP | 3 575 246 B1 | 12/2022 |
| GB | 1576650 A | 10/1980 |
| JP | H1059529 A | 3/1998 |
| JP | H10338327 A | 12/1998 |
| JP | 2001-253515 A | 9/2001 |
| TW | 1623472 B | 6/2018 |
| WO | 2012/024714 A2 | 3/2012 |
| WO | 2015/124524 A1 | 8/2015 |
| WO | 2017/027897 A1 | 2/2017 |
| WO | 2017/060301 A1 | 4/2017 |
| WO | 2018/132855 A1 | 7/2018 |
| WO | 2018/162123 A1 | 9/2018 |
| WO | 2018/201176 A2 | 11/2018 |
| WO | 2018/218266 A1 | 12/2018 |
| WO | 2019/016120 A1 | 1/2019 |

OTHER PUBLICATIONS

Achtzehn, Sonja et al., excerpt from the textbook "Lager Logisch", pp. 216-217, 222-223, 230-231, and 274-275, (2012), with English translation.

Baumann, Gerd et al., excerpt from the textbook "Logistische Pozesse, Berufe der Lagerlogistik", pp. 170-175, 186-191. 226-227, and 540-541, (May 22, 2018), with English translation.

"Overhead Conveying System, Fashion Logistics, eCommerce, Order Mail, Returns Processing, Loxxess Ag", published by SSI Schaefer Group on Feb. 20, 2015 available at: https://www.youtube.com/watch?v=bl7X9MiiuWA.

Wikipedia Article "Farbkreis", last edited on Jul. 2, 2021, with English translation.

"Flat goods and goods on hangers for store delivery and eCommerce, Stockmann", published by SSI Schaefer Group on Jan. 30, 2018, available at: https://www.youtube.com/watch?v=5U0TDpt1WAU.

"E-commerce solution with pocket sorter and robot workstation", Online article published by Telematic Markt.De on May 22, 2014 with translation.

"Hautnah fashion solutions", brochure published by Knapp AG in May 2014 and distributed at Knapp AG exhibition stand during CeMat trade fair in May 2014 with translation and description of relevant portion.

Photograph of Knapp AG exhibition stand at CeMat trade fair in May 2014 with description.

Opposition to European Patent EP 3810530 dated Mar. 7, 2024 with translation.

* cited by examiner

STORAGE AND PICKING SYSTEM HAVING IMPROVED STOCKING PERFORMANCE AND METHOD FOR OPERATING SAME

CROSS-REFERENCE TO RELATED APPLICATIONS

This application is the National Stage of PCT/AT2020/060038 filed on Feb. 10, 2020, which claims priority under 35 U.S.C. § 119 of Austrian Application Nos. A 50102/2019 filed on Feb. 11, 2019 and A 50124/2019 filed on Feb. 19, 2019, the disclosures of which are incorporated by reference. The international application under PCT article 21(2) was not published in English.

The invention relates to a method for operating a storage and order-picking system, in which predominantly or exclusively mixed articles are provided at an article receiving area of the storage and order-picking system and subsequently stored. Moreover, the invention relates to a storage and order-picking system having an article receiving area for providing predominantly or exclusively mixed articles, an article storage provided downstream of the article receiving area in respect of a conveying stream, and a picking station provided downstream of the article storage in respect of a conveying stream, which is connected to the article storage via a retrieval conveyor system. Furthermore, the storage and order-picking system comprises a first loading station, which is configured to load hanging bags with the article(s) in an article-specific manner, and a hanging bag sorting device for the hanging bags provided downstream of the first loading station, which sorting device is connected to the first loading station in respect of a conveying stream via a hanging bag conveyor system.

The known systems are in particular designed for the delivery of new articles. Such an article delivery characteristically comprises a comparatively high number of articles per article type. However, due to consumer behavior, in particular in e-commerce, there are significant amounts of return articles. Such a return characteristically comprises a comparatively low number of articles per article type, oftentimes only one item of an article type. Storing such (a) return article(s) into the article storage of the storage and order-picking system, entails particular problems, which are not sufficiently solved by known storage and order-picking systems. This often leads to delays in the process in the region between the article receiving area and the article storage.

It is therefore an object of the invention to specify an improved storage and order-picking system and an improved method for operating the same. In particular, the storing of the return article(s) is to be designed to be more efficient.

The object of the invention is achieved by a method for operating a storage and order-picking system, comprising the steps of
a) providing (predominantly) mixed articles at an article receiving area of the storage and order-picking system,
b) loading hanging bags with the articles in an article-specific manner at a first loading station, and acquiring (an) article type(s) of the article(s) loaded into the hanging bag(s),
c) transporting the loaded hanging bags into a hanging bag sorting device by means of a hanging bag conveyor system,
d) forming groups of hanging bags in the hanging bag sorting device based on an article-grouping rule, which allocated one or multiple specifiable article types to each group,
e) transporting the groups of hanging bags to a second loading station by means of the hanging bag conveyor system,
f) transferring the articles of one group contained in an article-specific manner in the hanging bags from the hanging bags into an article storage loading aid at the second loading station, and storing the article storage loading aid in an article storage of the storage and order-picking system by means of the storage conveyor system, wherein transferring and storing takes place without reference to a picking order and wherein the article storage loading aid is designed differently from a hanging bag,
g) acquiring picking orders for picking ordered articles and
h) processing a picking order comprising the steps
retrieving an article storage loading aid, which contains at least an ordered article allocated to the picking order, from the article storage by means of a retrieval conveyor system, and
loading a target loading aid with the at least one ordered article at a picking station.

The object of the invention is also achieved by a storage and order-picking system comprising
an article receiving area for providing mixed articles,
an article storage provided downstream of the article receiving area in respect of a conveying stream,
a picking station provided downstream of the article storage in respect of a conveying stream, which picking station is connected to the article storage via a retrieval conveyor system,
a first loading station, which is configured to load hanging bags with the articles in an article-specific manner,
a hanging bag sorting device for the hanging bags provided downstream of the first loading station, which hanging bag sorting device is connected to the first loading station via a hanging bag conveyor system,
a second loading station, which second loading station is provided downstream of the hanging bag sorting device in respect of a conveying stream and upstream of the article storage in respect of a conveying stream, which second loading station is connected to the hanging bag sorting device via the hanging bag conveyor system, which second loading station is connected to the article storage via a storage conveyor system, and which second loading station is configured to transfer the articles contained in the hanging bags in an article-specific manner from the hanging bags into an article storage loading aid, wherein the article storage loading aid is designed differently from a hanging bag, and
a control system, which is configured to
i) acquire an article type of an article loaded in a hanging bag,
ii) control the hanging bag sorting device for forming groups of hanging bags based on an article-grouping rule, which allocates one or multiple specifiable article types to each group,
iii) trigger transferring of the articles contained in the hanging bags from the hanging bags into the article storage loading aid and the storing of the article storage loading aids into the article storage by means of the storage conveyor system without reference to a picking order, and
iv) acquire picking orders for picking ordered articles, and
v) process a picking order, wherein the process of the picking order comprises
triggering the retrieval of an article storage loading aid, which contains at least an ordered article allocated to the picking order, from the article storage by means of the retrieval conveyor system, and controlling the loading of a target loading aid with the at least one ordered article at a picking station.

The specified method comprises forming groups of articles of the same article type(s) in the hanging bag sorting device. Due to its construction, such a hanging bag sorting device requires only relatively little installation space with respect to the capacity and/or with respect to the sorting performance. This advantage arises in particular when the hanging bags are each loaded with only a small number of articles or with only one article. By forming groups, however, the articles can also be stored efficiently by means of article storage loading aids, as relatively many articles are transferred into the article storage loading aid per provision of an article storage loading aid, which provision causes the time-consuming retrieval and storing of the article storage loading aid out of and into the article storage. An article storage loading aid is particularly efficient when a greater number of articles per article storage loading aid is stored. By the suggested measures, the advantages of the hanging bag technology are thus combined with those of the article storage loading aids, whereby the return storing of return articles, or generally of articles, present in low quantities per article type, can be carried out efficiently.

In a "storage and order-picking system" articles can for example be delivered to an article receiving area and optionally be repacked and stored in an article storage. For this purpose, the article storage may have shelf units with multiple storage places each. The articles can also be picked according to an order, meaning that they can be retrieved from the article storage collected for an order and provided for transport at the article issue area. As opposed to a manufacturing process, the articles are not substantially changed between the article receiving area and the article issue area. However, a slight change in shape is possible, in particular in case of non-rigid bodies such as pouches or bags or other resilient packaging, for example from cardboard or plastic materials. A storage and order-picking system may also have one or multiple sorting devices, with which articles can be brought into a specified or specifiable sequence.

"Articles" are generally objects of merchandise trade and they are delivered at the article receiving area and transported, at the article issue area, to a customer according to an order. Articles which are allocated to an order are referred to within the scope of the invention as "ordered articles." The allocation to an order can be done for articles already in storage or, in principle, even before. Within the scope of the invention, "(an) article(s)" or "(an) ordered article(s)" is/are understood to mean in particular an individually-manipulatable object and/or an individually-manipulatable group of objects. It should generally be noted that (an) "article(s)" and (an) "ordered article(s)" may be one and the same object at different points in time. The articles may exclusively comprise lying articles or lying articles and hanging articles.

An "article type" states the kind of (an) article(s). For example, in textile industry, "shirt, white, size small", "shirt, black, size large", T-shirt, red, size XL", "trousers, size 34/34" or "socks, black, size 43" or the like may be provided as article types. In other words, different article types are referred to when the respective article (shirt, trousers, T-shirt etc.) is different for example with respect to size and/or color etc. In general merchandise, for example different household appliances each with different product features and the like or different cosmetics each with different packaging sizes and the like may be provided as the article type.

Within the scope of the invention, at least an "order for picking articles" (in short "picking order") comprises the article type and the quantity of one or multiple articles desired by the customer. The articles are stored (mainly or exclusively) in the article storage.

Within the scope of the invention, "order-picking" is to be understood to mean the compilation of articles for a picking order, in the narrower sense the loading of a target loading aid with the article(s) of the picking order.

In the context of an article storage loading aid, "article-specific" means that the articles stored in a loading aid belongs to the same article type. For example, a first loading aid contains the article "A" and a second loading contains the article "B" and so on. On the other hand, the loading aids may be subdivided into multiple receiving compartments by separating walls and receive different article types, wherein an article "A" may be received in the first receiving compartment and an article "B" may be received in the second receiving compartment.

In the context of a hanging bag, "article-specific" means that the articles stored in a hanging bag belong to the same type of article if more than one article is transported in the hanging bag. Hanging bags loaded with only one (single) article are loaded in an article-specific manner, anyway.

"Mixed" or "non-article-specific" articles, however, belong to different article types. Providing mixed articles (lying articles or lying articles and hanging articles) is understood to mean the provision of articles of different article types.

In the context of an article storage loading aid, "mixed" or "non-article-specific" articles mean that articles of different types are stored in the loading aid or in a receiving compartment of the loading aid.

An "article receiving area" is understood to be the region in which articles are delivered into the storage and order-picking system. Generally, the article receiving area may also be referred to as "article delivering zone". In particular, article carriers (e.g. pallets, cardboard boxes etc.) which have been delivered can be separated in a manual or automated manner. This process is also referred to as "de-palletizing".

An "article issue area" is understood to be the region in which ordered articles are dispatched from the storage and order-picking system. Generally, the article issue area may also be referred to as "article dispatch zone".

A "delivery loading aid" is a loading aid which serves to transport the articles to the storage and order-picking system. This may be configured in particular as a cardboard box, pallet, hanging bag or shelf unit.

An "article storage loading aid" generally serves to store and transport articles in the storage and order-picking system and may be configured in particular as a container, cardboard box, tablet, pallet or shelf unit. The loading aids may have multiple receiving areas/receiving compartments.

Storing the articles in the article storage may also be carried out directly with a delivery loading aid, which then takes on the role of the article storage loading aid.

A "target loading aid" serves to receive the articles during the picking process and may also be configured as a container, cardboard box, tray, pallet, bag (in particular as a "polybag"), pouch, sack, hanging bag, or shelf unit. The target loading aid may in particular function as a "dispatch loading aid" and serve to transport articles out of the storage and order-picking system. Yet the target loading aid may also function as an "interim loading aid", in which articles that have been picked and are intended for dispatching are interim-stored before being reloaded into a dispatch loading aid.

A "hanging bag" comprises in particular a front wall, a rear wall, a storing space limited by the front wall and the rear wall, and a loading opening and/or unloading opening configured at the hanging bag at a first side and limited by the front wall and the rear wall. The front wall may be provided with a base plate. The hanging bag may at a second side also have a side wall stop, against which the article(s) can be applied. In particular, the front wall and the rear wall may be formed as a single piece, for example by a length of fabric or woven cloth, which is mounted at an overhead track/suspension rod at its upper end and forms a loop at its lower end. In a closed position, the front wall and the rear wall have only a small distance from each other, whereby the loading opening and unloading opening has a small surface area and the storing space of the hanging bag has a small volume. In the case of a length of fabric or woven cloth, its upper ends equally have only a small distance from each other, and the loop formed by the length of fabric or woven cloth is narrow. In the closed position, the article(s) can thus be stored and transported in a narrow space. In an open position, in contrast, the front wall and the rear wall have a large distance from each other, whereby the loading opening and unloading opening has a large surface area and the storage space of the hanging bag has a large volume. In the case of a length of fabric or woven cloth, its upper ends equally have a large distance from each other, and the loop formed by the length of fabric or woven cloth is wide. In the open position, the hanging bag is thus easy to load and unload. Such a hanging bag is disclosed, for example, in the German utility model DE 20 2017 106 993 U1, DE 20 2017 100 206 U1 or the Austrian patent applications A 50320/2018 and A 50059/2019. In a particular embodiment, the hanging bag may also have a bottom flap that is opened during the unloading operation. In particular, the bottom flap may be opened automatically by an unloading device.

A possible embodiment of a transport carrier for suspended transport of a hanging bag is described, for example, in the Austrian patent application A 50092/2019.

It should also be noted in this context that not all hanging bags must have the same properties, but hanging bags may also be configured differently. In addition, hanging bags may have multiple storing zones/storing compartments.

A "conveying system" generally serves to transport loading aids and/or articles. The conveying system may be segmented into different, functional regions, for example a "storage conveyor system" serving to transport articles into an article storage, and a "retrieval conveyor system" serving to transport articles from the article storage, as well as a "hanging bag conveyor system" serving to transport hanging bags. The individual regions of the conveying system may furthermore be subdivided into multiple sections. For example, the storage conveyor system, the retrieval conveyor system and/or the hanging bag conveyor system may each be segmented in multiple sections. The conveying system may moreover be technologically divided into a "stationary conveying system" and "conveying vehicles operated in an automated manner". This means that the hanging bag conveyor system and/or the hanging bag sorting device and/or the storage conveyor system and/or the retrieval conveyor system of the storage and order-picking system may comprise a stationary conveying system and/or autonomous mobile robots.

For the transport of articles, a stationary conveying system requires permanently-arranged devices. A stationary conveying system is to be understood to mean, in particular, roller conveyors, belt conveyors, band conveyors, chain conveyors and suchlike. A stationary conveying system may, in particular, also comprise an "overhead track", on which hanging bags can stored and/or transported in a suspended manner.

"(Autonomous) conveying vehicles operated in an automated manner" are to be understood to mean self-propelled and/or driverless conveying vehicles for the transport of articles, which travel along permanently specified lanes or which are freely guided, i.e. without fixed track guidance. A fixed track guidance can be specified at the floor of the travel surface, for example using optical color stripes, magnetic strips, marker tags or also rails. A conveying vehicle operated in an automated manner has in particular a transport platform, on which the articles to be transported are received temporarily. Instead of the transport platform, or additionally to it, the conveying vehicle operated in an automated manner may also have a (telescopable) suspension rod and/or overhead track for receiving hanging bags. For example, the transport platform/suspension rod may be permanently affixed to the conveying vehicle, yet the transport platform/suspension rod may also be vertically and/or laterally movable relative to a chassis of the conveying vehicle, for example to be able to store articles into a storage rack and retrieve them from the storage rack. Wheels, of which at least one is driven, are arranged at the chassis. Further, a conveying vehicle operated in an automated manner also comprises an electronic control for receiving commands by a superordinate (central) control and for controlling the movements of the conveying vehicle operated in an automated manner.

A "storage and retrieval device" is a conveying vehicle operated in an automated manner which travels on rails and may be designed as a single-level storage and retrieval device (also referred to as "shuttle") or as a multi-level storage and retrieval device. For their operation, storage and retrieval devices require elements of fixed-installation conveying device(s) (namely the rails). For this reason, storage and retrieval devices are counted among fixed-installation conveying device(s).

An "autonomous mobile robot" is a non-rail guided (driverless) conveying vehicle operated in an automated manner. At least one of the wheels is steerable, unless the autonomous conveying vehicle has wheels with which also a lateral movement can be executed (e.g. Mecanum wheels). An autonomous mobile robot also comprises sensors for capturing the environment of the mobile robot and for spatial orientation. Such autonomous mobile robots are known to the person skilled in the art as "autonomous guided vehicles", in short "AGV."

A "hanging bag conveyor system" comprises multiple "overhead tracks." Hanging bags are stored and/or transported in a suspended manner on the hanging bag conveyor system.

A "sorting overhead track" is thus an overhead track in the hanging bag sorting device. A "transport overhead track" is an overhead track via which hanging bags can be transported in a suspended manner. A "mobile storage overhead track" is a movable overhead track which is not fixed at a particular location. A mobile storage overhead track may in particular be structured similarly to a mobile shelf unit and equally have wheels for easier transport.

A "hanging bag sorting device" is a device with which hanging bags and/or articles stored therein can be brought into a specified or specifiable sequence. In particular, "hanging bag groups" are formed in the hanging bag sorting device. Hanging bags can also be stored for a short period in the hanging bag sorting device. Thus, the hanging bag sorting device may also be understood as hanging bag buffering device, which can preferably sort and buffer the hanging bags. A sorting overhead track is thus equivalent to a buffer overhead track.

A "hanging bag group" comprises a plurality of hanging bags, which (immediately) follow each other on an overhead track and in which articles fulfilling an "article-grouping rule" are stored.

An "article-grouping rule" allocates one or multiple specifiable article types to each hanging bag group. An article-grouping rule can be acquired by the operator of the storage and order-picking system on a control system of the storage and order-picking system and be processed by the latter. The article-grouping rule can also be understood to mean a loading order for the article storage loading aids.

A "picking station" is a station and/or a zone or location, at or in which ordered articles can be loaded into a target loading aid. The picking station may have a picking station control for controlling the picking operation of the ordered articles. Yet it would also be conceivable that the picking process is controlled, alternatively or additionally, by a central controller of the storage and order-picking system.

At the "first loading station", articles delivered are loaded into a hanging bag, either manually by a person or automatically by a loading device, in particular by a robot. Additionally, an article type of the article loaded into the hanging bag is acquired at the first loading station. At the first loading station, the article type is thus linked by data technology to the corresponding hanging bag. For this purpose, each hanging bag may be allocated an identifying means, in particular an RFID (radio frequency identification device) transponder. The identifying means may also be arranged on the hanging bag or on the transport carrier if the hanging bag is transported in a suspended manner by means of a transport carrier.

Furthermore, the information, which article type was loaded in which hanging bag, may be saved.

At the "second loading station", articles contained in the hanging bags are transferred into an article storage loading aid, again either manually by a person or automatically by a loading device, in particular by a robot. The loading device at the second loading station may also be formed by an unloading station for automatic unloading of a hanging bag, as it is described, for example, in the Austrian patent application A 50320/2018. In this regard, unloading the hanging bag may be carried out either directly into the article storage loading aid or via a conveying device (chute), which connects the hanging bag to be unloaded and the article storage loading aid to be filled.

A "provisioning" is generally a position at which an article, a hanging bag, or a loading aid is supplied and/or provisioned. At this position, a loading and/or unloading of the respective loading hanging bag or the respective loading aid is possible. For example, the provisioning position may be formed by a stopping position for an article storage loading aid or a hanging bag on a conveying system.

A "control system" generally serves to control the elements of the storage and order-picking system, in particular the conveying system of the storage and order-picking system. The control system may be formed by a single control or comprise multiple controls, which are connected to each other and cooperate. The controls may also possibly be hierarchically structured. For example, the control system may comprise an order-processing computer, which serves to acquire an order and prepare the same. In particular, the control system also comprises the controls of the first and second loading station and of the picking station.

Further advantageous designs and further advancements of the invention are discussed below.

It is also advantageous if the presented method additionally comprises the following steps:

a') providing mixed articles at the article receiving area of the storage and order-picking system, wherein the articles also comprises mixed hanging articles, b') loading hanging bags and/or hanging article transport carriers with the hanging articles in an article-specific manner at the first loading station, and acquiring (an) article type(s) of the hanging article(s) loaded in/on the hanging bag(s) and/or on the hanging article transport carrier(s), c') transporting the loaded hanging bags and/or the loaded hanging article transport carriers into the hanging bag sorting device with the aid of the hanging bag conveyor system, d') forming groups of hanging bags and/or hanging article transport carriers in the hanging bag sorting device based on the article-grouping rule, which allocates one or multiple specifiable article types to each group, e') transporting the groups of hanging bags and/or the groups of hanging article transport carriers to the second loading station by means of the hanging bag conveyor system, f') transferring the hanging articles, which are loaded into/onto the hanging bags and/or on the hanging article transport carriers, of a group of hanging bags and/or hanging article transport carriers into/onto an article storage hanging article loading aid, which is comprised by the article storage loading aids, at the second loading station, and storing the article storage hanging article loading aid in the hanging article article storage, which is comprised by the article storage of the storage and order-picking system, by means of the storage conveyor system, wherein transferring and storing takes place without reference to a picking order, and wherein the article storage hanging article loading aid comprises, in particular, a suspension rod, g') acquiring picking orders for picking ordered hanging articles, which are comprised by the ordered articles, and h') processing a picking order comprising the steps of
retrieving an article storage hanging article loading aid, which contains at least one ordered hanging article allocated to the picking order, from the hanging article article storage, by means of the retrieval conveyor system, and
loading a target loading aid with the at least one ordered hanging article at a picking station.

Accordingly, it is also advantageous if
the article receiving area is configured to provide mixed articles, which also comprise hanging articles,
a hanging article article storage provided downstream of the article receiving area in respect of a conveying stream is provided, which is comprised by the article storage of the storage and order-picking system,
the picking station is provided downstream of the hanging article article storage in respect of a conveying stream and connected to the hanging article article storage via a retrieval conveyor system,
the first loading station is configured to load hanging bags and/or hanging article transport carriers with the hanging articles in an article-specific manner,
the hanging bag sorting device is also configured to transport hanging article transport carriers,
the second loading station is provided upstream of the hanging article article storage in respect of a conveying stream and connected to the hanging article article storage via the storage conveyor system, wherein the second loading station is also configured to transfer the hanging articles loaded in the hanging bags and/or on the hanging article transport carriers in an article-specific manner from the hanging bags and/or the hanging article transport carriers into/onto an article storage hanging article loading aid, and wherein the article storage hanging article loading aid is comprised by article storage loading aids and in particular has a suspension rod, and the control system is also configured to
  i) acquire an article type of a hanging article loaded in/on the hanging bag and/or on the hanging article transport carrier,
  ii) control the hanging bag sorting device for forming groups of hanging bags and/or hanging article transport carriers based on an article-grouping rule, which allocates one or more specifiable article types to each group,
  iii) trigger the transferring of the hanging articles loaded in/on the hanging bags and/or on the hanging article transport carriers from the hanging bags and/or from the hanging article transport carriers into/onto an article storage hanging article loading aid and the storing of the article storage hanging article loading aid into the hanging article article storage by means of the storage conveyor system without reference to a picking order,
  iv) acquire picking orders for picking ordered hanging articles, which are comprised by ordered articles, and
  v) process a picking order, wherein the process of the picking order comprises
    triggering the retrieval of an article storage hanging article loading aid, which contains at least one ordered hanging article allocated to the picking order, from the hanging article article storage by means of the retrieval conveyor system, and
    controlling the loading of a target loading aid with the at least one ordered hanging article at a picking station.

"Hanging articles" are articles which are transported in a suspended manner, for example on a clothes hanger. Examples of hanging articles are articles of clothing suspended on clothes hangers. In the present context, "hanging article" stands in contrast to "lying article". Lying article(s) is/are article(s) being transported and stored lying on a ground. In contrast to this, hanging article(s) is/are suspended below the overhead tracks of the hanging bag sorting device, hanging bag conveyor system and suchlike. At this point, it should be noted that an article being able to be transported in a suspended manner does not automatically become a hanging article. That is to say that it is also conceivable that hanging articles are also transported lying down. For example, due to folding, an article may be treated as a lying article instead of a hanging article. Thus, a shirt is not automatically a hanging article but it depends on whether the shirt is transported in a suspended or a lying manner.

A "hanging article article storage" serves to store hanging articles.

An "article storage hanging article loading aid" serves to collect a hanging article. An article storage hanging article loading aid can be understood to mean a suspension rod on which multiple hanging articles are hung by means of clothes hangers. Such a suspension rod may be part of a mobile shelf unit or part of a mobile storage and retrieval device but may also be installed in the hanging article article storage. Otherwise, the article storage hanging article loading aid may comprise a chassis with running wheels and the suspension rod fastened to the chassis or removable from the chassis, wherein the article storage hanging article loading aid may be arranged, with the chassis, on a (stationary) overhead track and moved along the overhead track (driven or not driven). However, article storage hanging article loading aid may also be understood to mean clothes hangers hooked together, wherein one hanging article can be received per clothes hanger. In a special case, the hanging bag itself forms the article storage hanging article loading aid or a part thereof, namely when the hanging bag has a hook or an eyelet at the interior and/or exterior, onto or into which a clothes hanger may be hung.

At this point, it should be noted that lying articles, within the scope of this disclosure, are transported and stored in lying article loading aids, wherein the lying article loading aids are stored in lying article article storages. In contrast, hanging articles are transported and stored in hanging article loading aids, wherein the hanging article loading aids are stored in hanging article article storages. The general terms "articles", "article storage loading aid", "article storage", "ordered article(s)" and so on are accordingly to be read as "lying articles", "article storage lying article loading aid", "lying article article storage", "ordered lying article(s)" if the relevant passage refers to (a) lying article(s), and as "hanging articles", "article storage hanging article loading aid", "hanging article article storage", "ordered hanging article(s)" if the relevant passage refers to (a) hanging article(s).

It is advantageous if steps e) and f) are carried out when the number of hanging bags of a group reaches a hanging bag group size threshold value or the number of articles in the hanging bags of a group reaches an article group size threshold value. Consequently, the relevant hanging bags are transported to the second loading station and the articles contained in the hanging bags are transferred into an article storage loading aid if the above condition applies. However, if the hanging bag group size threshold value or the article group size threshold value has not yet been reached, the attempt of forming a group and/or extending the group continues. For this purpose, the hanging bags are sorted and/or buffered. By the suggested measures, the transport of groups, which are too small, to the second loading station and a loss of efficiency of the presented method is prevented.

It is also advantageous if steps e) and f) are carried out when the dwell time of hanging bags, hanging bag groups or articles in the hanging bag sorting device reaches a dwell time threshold value. Consequently, the relevant hanging bags are transported to the second loading station and the articles contained in the hanging bags are transferred into an article storage loading aid if the above condition applies, in order to prevent hanging bags from remaining in the hanging bag sorting device for too long. In particular, individual hanging bags, for which no partner can be found and which consequently do not belong to any group, are also transported to the second loading station. However, if the dwell time threshold value has not yet been reached, the attempt of forming a group and/or extending the group continues. For this purpose, the hanging bags are sorted and/or buffered.

It is further favorable if exclusively return articles are loaded into the hanging bags and treated according to steps b) to h). The presented method is particularly suitable for this article class, as return articles are usually mixed and provided at the article receiving area in low quantities per article type.

It is also advantageous if no less than 10% of the hanging bags, which pass through the hanging bag sorting device or are in stock in the hanging bag sorting device, are allocated to a group in step d). This way, the storage and order-picking system can be operated particularly efficiently.

Furthermore, it is advantageous if step a) also comprises providing (an) article(s) at the article receiving area of the storage and order-picking system, which is provided in an article-specific manner by means of a delivery loading aid, and if the article(s) is/are stored in the article storage while bypassing steps b) to f) and without reference to a picking order, wherein
- the delivery loading aid is stored directly into the article storage, or
- the article(s) is/are transferred at the second loading station or at a third loading station from the delivery loading aid into an article storage loading aid, and the loaded article storage loading aid is stored in the article storage.

This means that articles provided in an article-specific manner by means of a delivery loading aid can be stored in the article storage while bypassing the hanging bag sorting device, whereby the hanging bag sorting device is relieved and can thus be dimensioned smaller.

It is further favorable if, in step b), only a single article is loaded in each hanging bag. This way, the loading process of the hanging bag, the forming of hanging bag groups and the unloading of the hanging bags is possible in a particularly simple manner.

It is particularly advantageous if exactly one specifiable article type is allocated to the hanging bag group, and the hanging bag groups are formed with articles of the same article type. This way, incorrect loading of an article storage loading aid or of a target loading aid can virtually be precluded.

However, it is also particularly advantageous if multiple specifiable article types are allocated to the hanging bag group by the article-grouping rule, and the hanging bag groups are formed with articles of different article types, wherein
- a volume of a first article of a first article type is at least twice the volume of a second article of a second article type and/or
- a weight of a first article of a first article type is at least twice the weight of a second article of a second article type, and/or
- a longest dimension of a first article of a first article type is at least twice the longest dimension of a second article of a second article type, and/or
- an optical degree of reflection of a first article of a first article type is at least twice the degree of reflection of a second article of a second article type, and/or
- a color of a first article of a first article type, is at least 30° removed in a color wheel (in particular in a color wheel according to Itten) from a color of a second article of a second article type.

This way, the articles contained in the hanging bags of a hanging bag group can be distinguished well by a person or also by an optical image capturing system of a robot. Consequently, an article storage loading aid can be loaded and/or a target loading aid can be loaded with a very low error rate, even if the hanging bags of a hanging bag group contain articles of multiple article types. This means that an article of an incorrect article type is rarely or never loaded in the article storage loading aid or target loading aid.

It is further advantageous if after step d), the hanging bags of a group are present in blocks sorted with respect to the article type of the articles contained therein. Within a group, a block with articles of a first article type is then followed by a block with articles of a second article type and so on. This way, article storage loading aids can be loaded easily and efficiently in an article-specific manner, even if hanging bag groups comprise articles of different article types. Of course, a block may also be considered an independent hanging bag group.

However, it is also advantageous if after step d), the hanging bags of a group are chaotically distributed with respect to the article type of the articles contained therein. This means that, in this case, the blocks are not necessarily formed of the same article type. The sorting effort for forming a group can thus be kept low.

It is particularly advantageous if the article storage loading aids in step f) are loaded at the second loading station in an article-specific manner with articles of one (single) article type. This way, incorrect loading of a target loading aid during picking can virtually be precluded.

However, it is also particularly advantageous if in step f), the article storage loading aids are loaded at the second loading station with articles of different article types, wherein
- a volume of a first article of a first article type is at least twice the volume of a second article of a second article type, and/or
- a weight of a first article of a first article type is at least twice the weight of a second article of a second article type, and/or
- a longest dimension of a first article of a first article type is at least twice the longest dimension of a second article of a second article type, and/or
- an optical degree of reflection of a first article of a first article type is at least twice the degree of reflection of a second article of a second article type, and/or
- a color of a first article of a first article type, is at least 30° removed in a color wheel (in particular in a color wheel according to Itten) from a color of a second article of a second article type.

This way, the articles contained in the article storage loading aids can be distinguished well by a person or also by an optical image capturing system of a robot. Consequently, a target loading aid can be loaded with a very low error rate during picking, even if the article storage loading aids contain articles of multiple article types. This means that an article of an incorrect article type is rarely or never discharged into the target loading aid.

Lastly, it is particularly advantageous if in step g), it is checked whether an ordered article to be picked is in stock in the hanging bag sorting device and, upon a positive result of the check, instead of step h), for processing a picking order
- a hanging bag, which contains at least an ordered article allocated to the picking order, is retrieved from the hanging bag sorting device by means of the hanging bag conveyor system, and
- a target loading aid is loaded at the picking station with the at least one ordered article.

Thus, the article storage is relieved and can be dimensioned smaller as an article required for a picking order does not necessarily have to be stored in the article storage.

At this point, it should be noted that the variants and advantages disclosed for the presented storage and order-picking system can likewise refer to the presented method and vice versa.

For the purpose of better understanding of the invention, it will be elucidated in more detail by means of the figures below.

Figure 2:
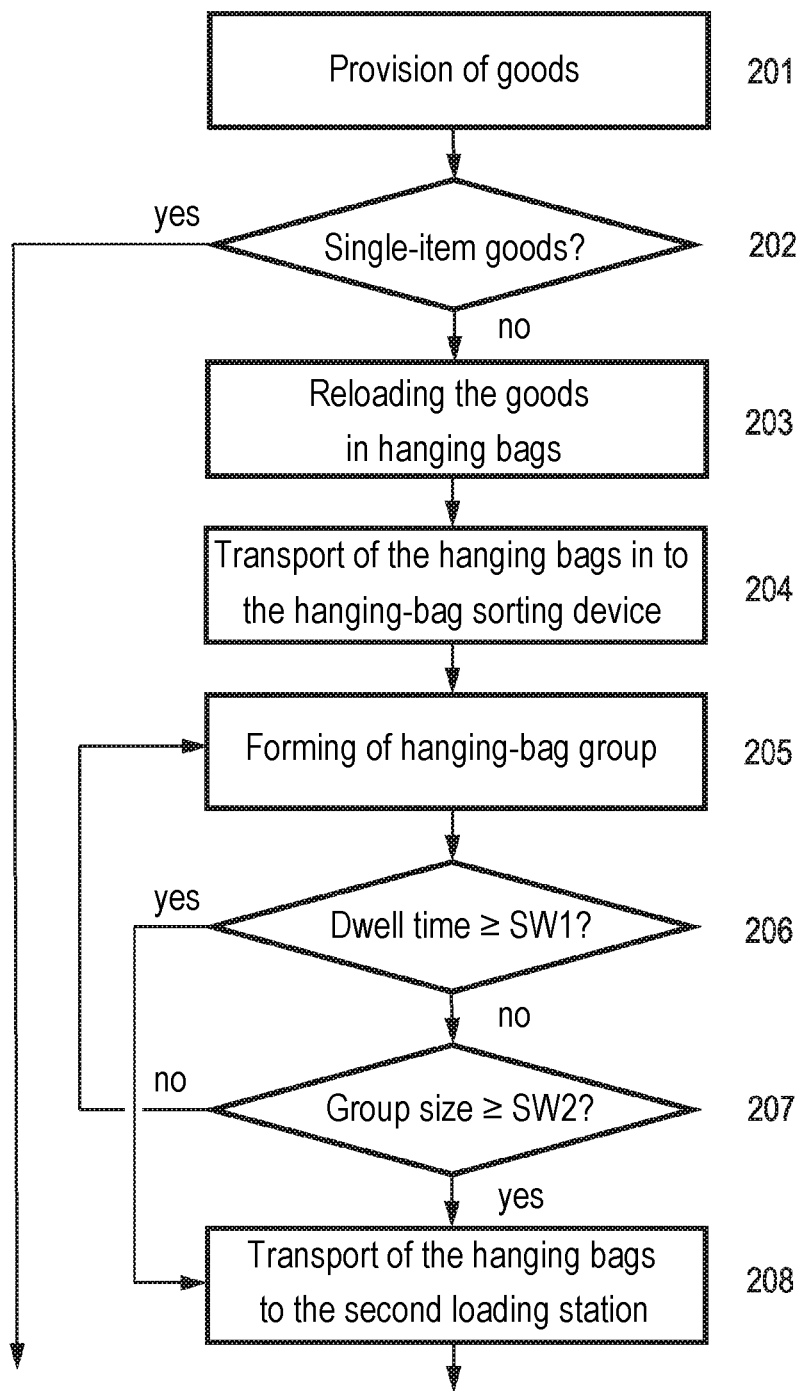
Figure 3:
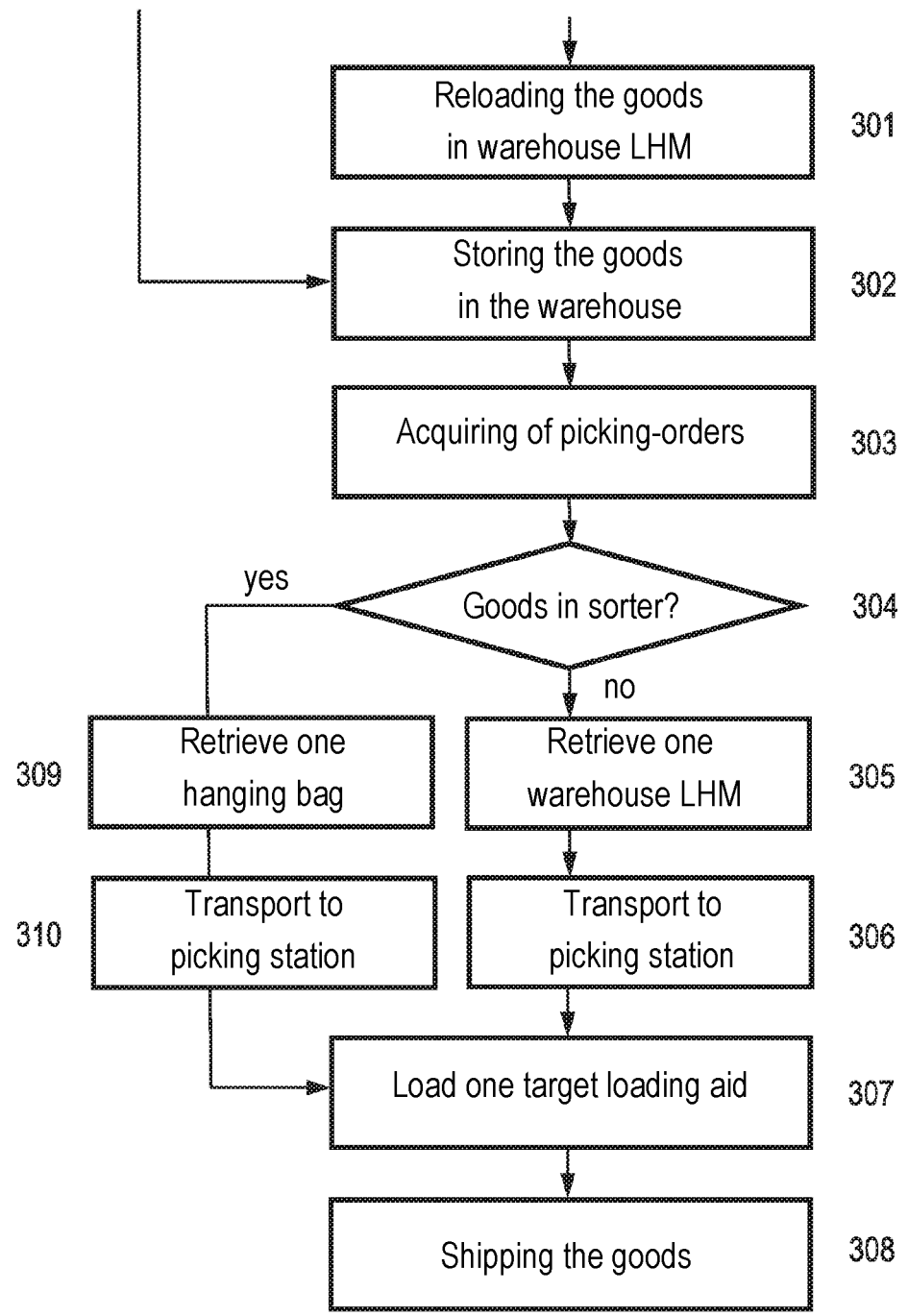
Figure 4:
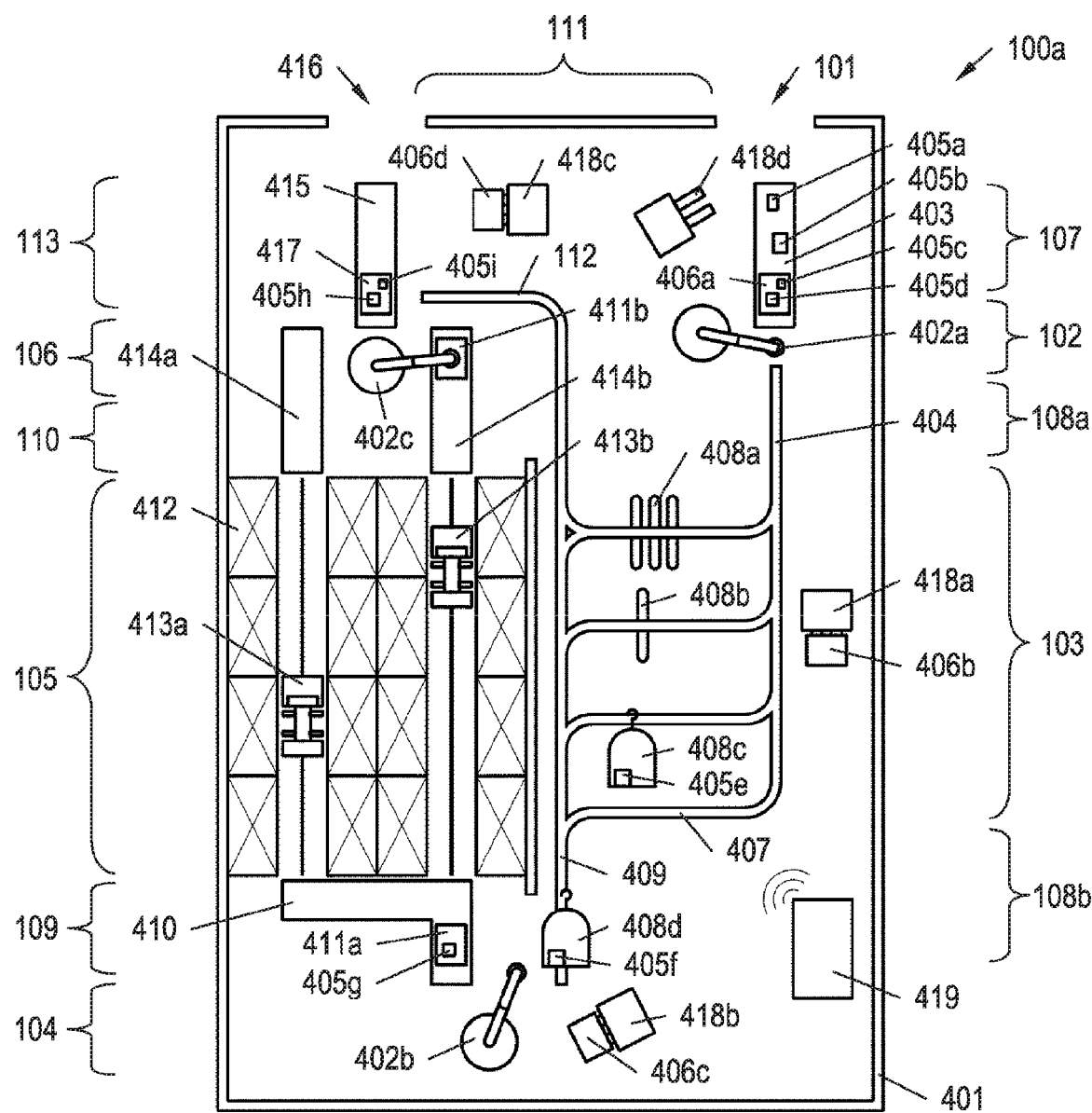
Figure 5:
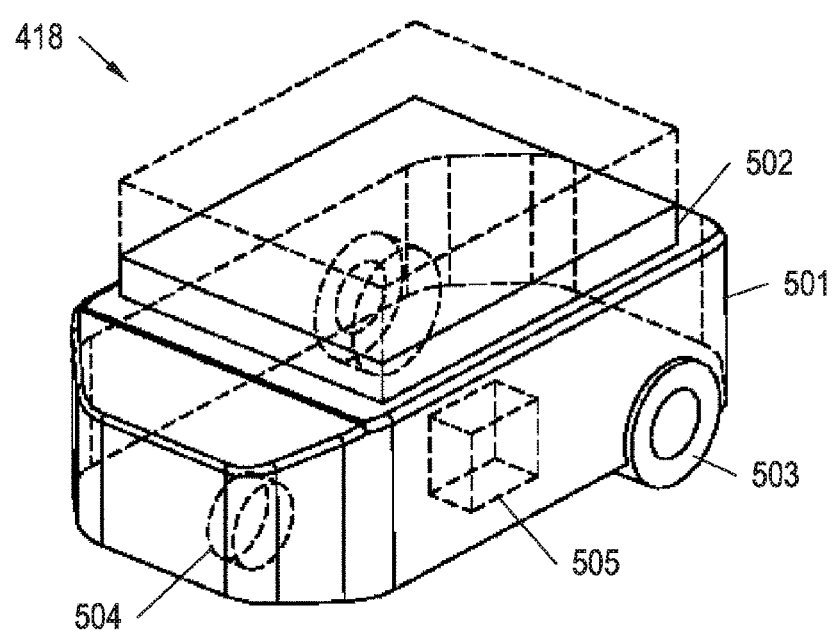
Figure 6:
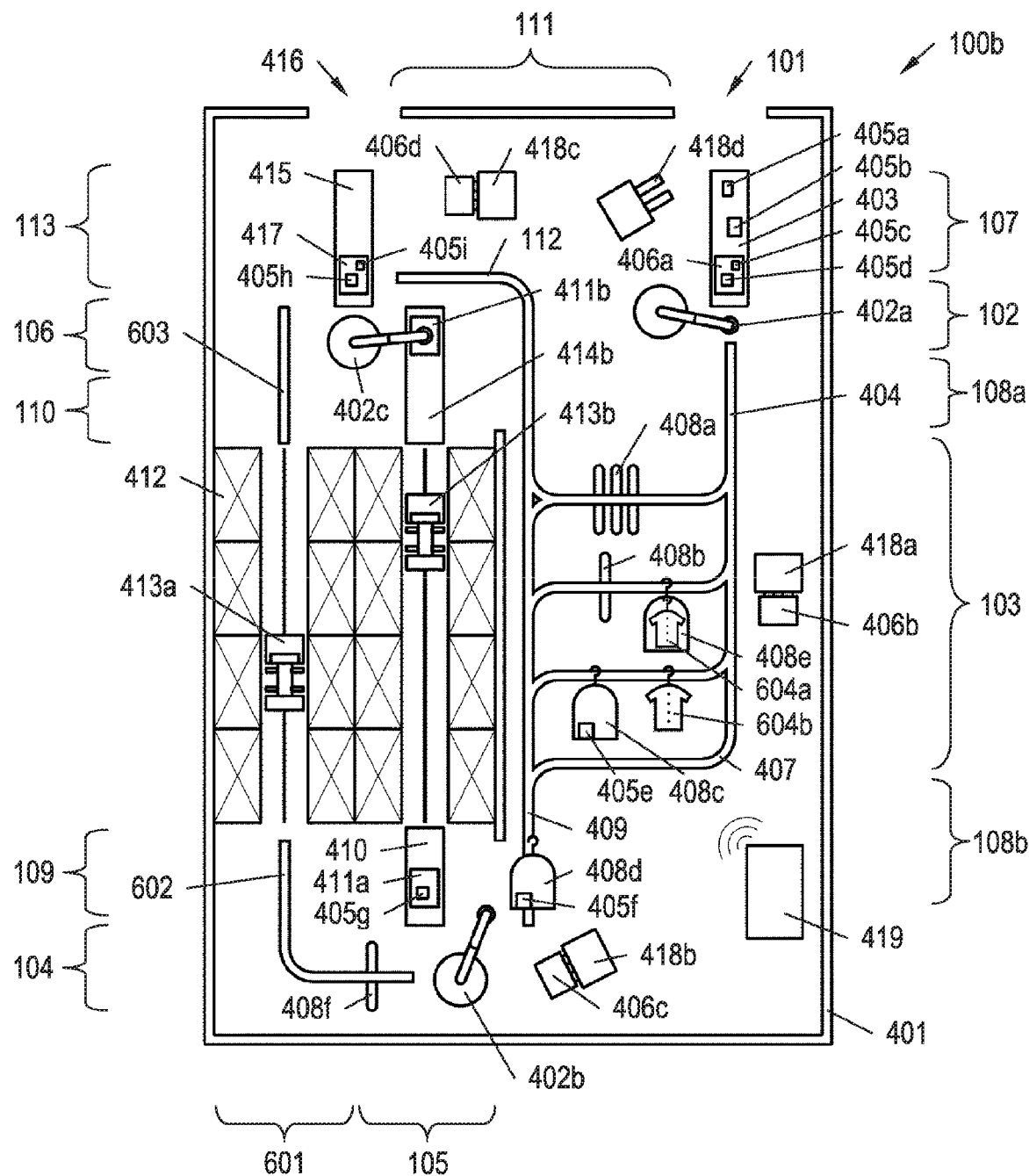
Figure 7:
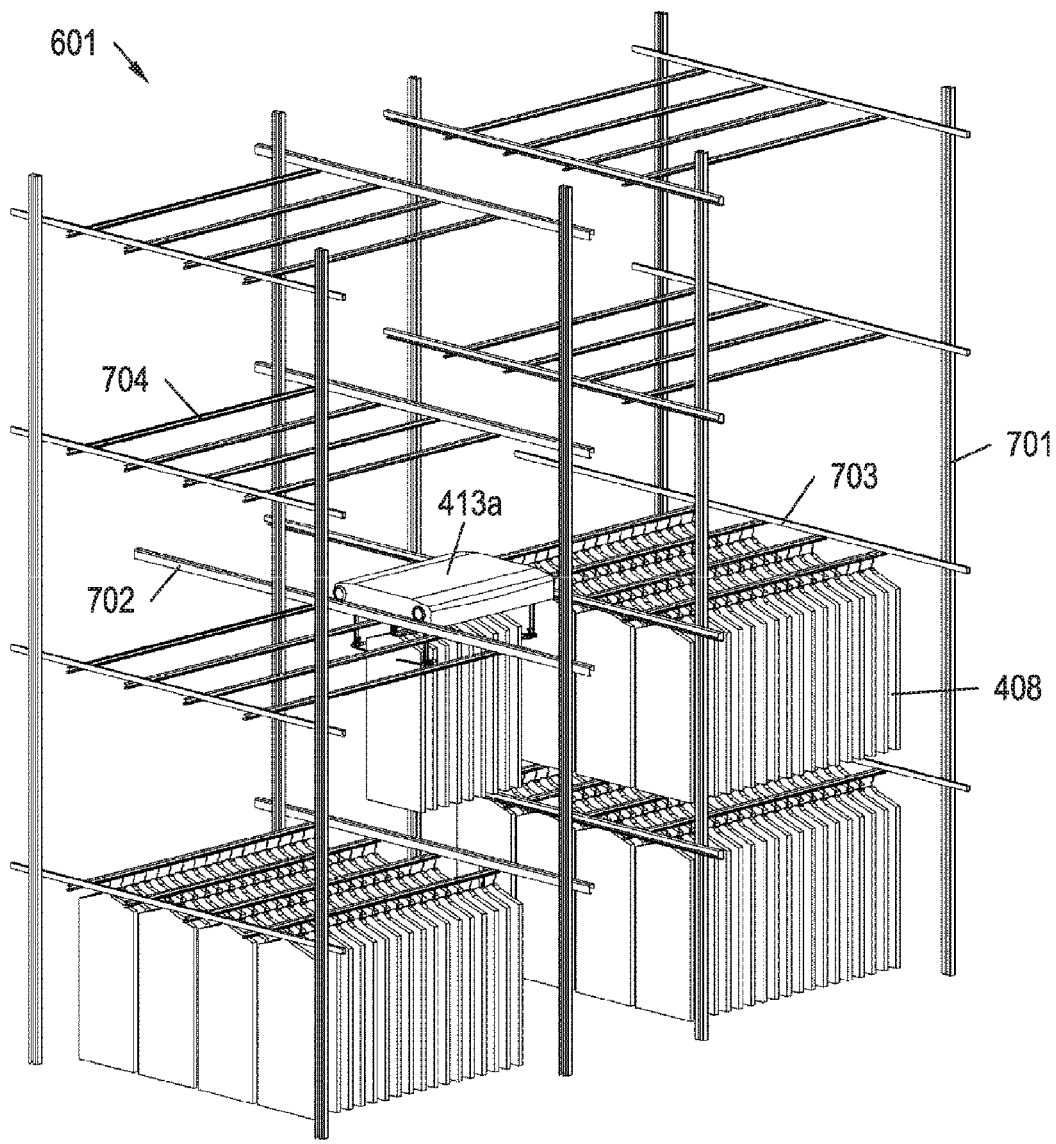
Figure 8:
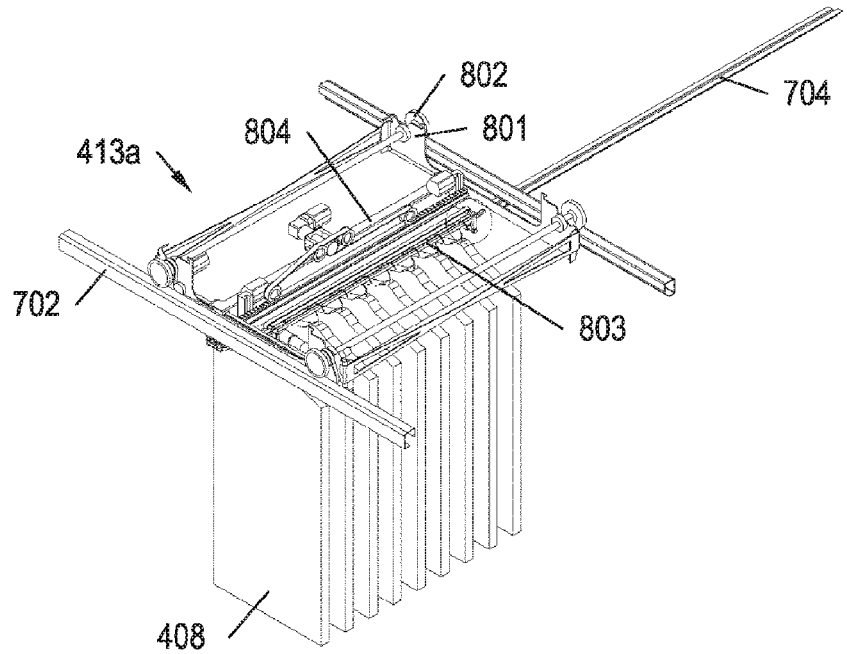
Figure 9:
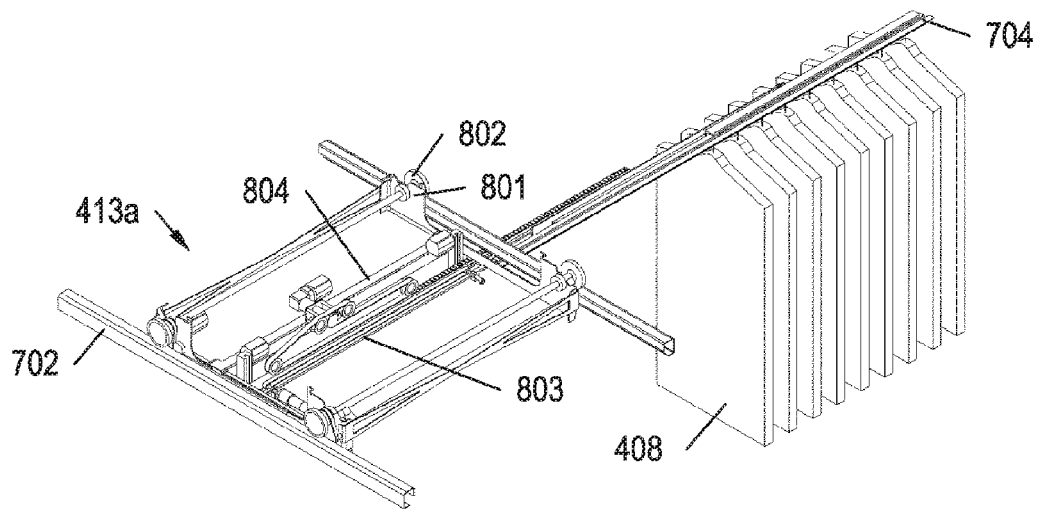
Figure 10:
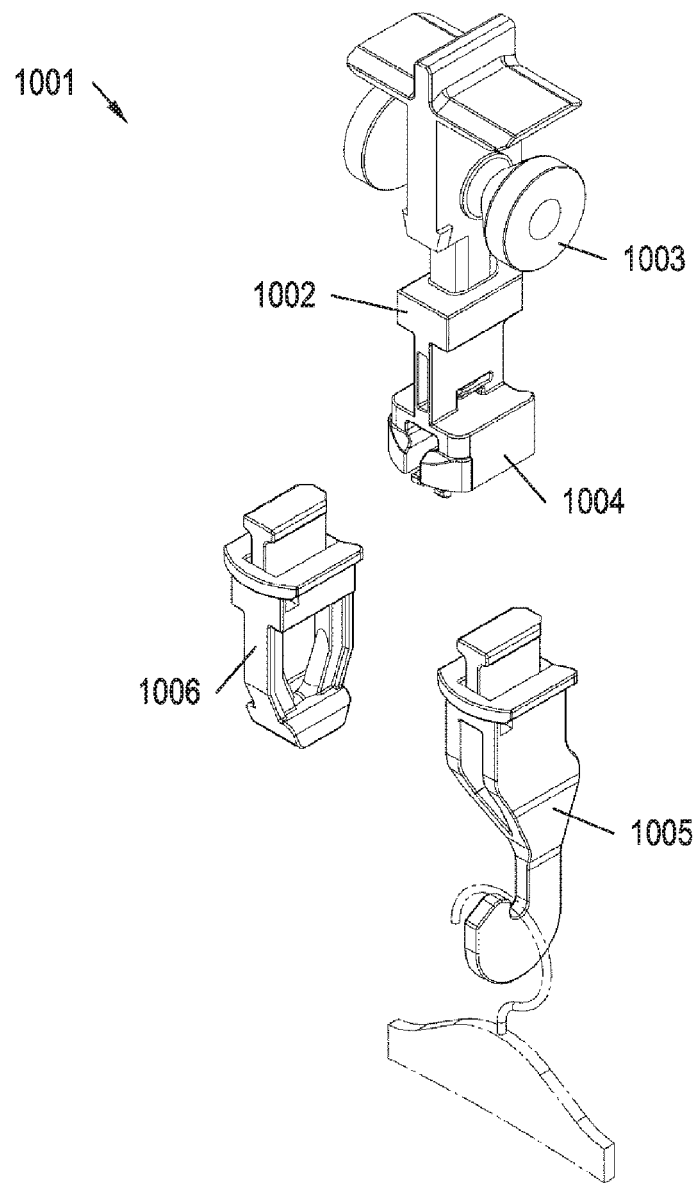

These show in a respectively very simplified schematic representation:

FIG. 1 the basic structure of the presented storage and order-picking system;

FIG. 2 a first part of the fundamental process of articles passing through the storage and order-picking system;

FIG. 3 the second part of the fundamental process of articles passing through the storage and order-picking system following the first part;

FIG. 4 an example shown in detail of a storage and order-picking system in a top view;

FIG. 5 an example of an autonomous mobile robot in an oblique view;

FIG. 6 similar to FIG. 4 but with an additional hanging article article storage;

FIG. 7 an exemplary hanging article article storage in an oblique view;

FIG. 8 an oblique view of an exemplary storage and retrieval device, which is configured to manipulate hanging articles, in a moving position;

FIG. 9 the storage and retrieval device of FIG. 8 in a storage/retrieval position; and FIG. 10 an exemplary hanging article transport carrier in an oblique view.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, are to be analogously transferred to the new position.

FIG. 1 shows the basic structure of the storage and order-picking system 100a. The storage and order-picking system 100a comprises:

an article receiving area 101 for provided predominantly mixed articles, a first loading station 102 provided downstream of the article receiving area 101 in respect of a conveying stream, which loading station 102 is configured to load hanging bags with the article(s) provided at the article receiving area 101 in an article-specific manner, a hanging bag sorting device 103 for the hanging bags provided downstream of the first loading station 102 in respect of a conveying stream;

a second loading station 104 provided downstream of the hanging bag sorting device 103 in respect of a conveying stream, which loading station 104 is configured to transfer articles contained in the hanging bags in an article-specific manner from the hanging bags into an article storage loading aid, wherein the article storage loading aid is configured differently from a hanging bag, an article storage 105 provided downstream of the second loading station 104 in respect of a conveying stream, and a picking station 106 provided downstream of the article storage 105 in respect of a conveying stream.

The conveying stream connection between the article receiving area 101 and the second loading station 104 is established via an article receiving area conveyor system 107. The conveying stream connection between the first loading station 102, the hanging bag sorting device 103 and the second loading station 104 is established via a hanging bag conveyor system, which in this case comprises a first section 108a and a second section 108b. Inside the hanging bag sorting device 103, the hanging bags are also transported via the hanging bag conveyor system. The conveying stream connection between the second loading station 104 and the article storage 105 is established via a storage conveyor system 109. The conveying stream connection between the article storage 105 and the picking station 106 is established via a retrieval conveyor system 110.

The storage and order-picking system 100a shown by way of example in FIG. 1 also comprises an optional first bypass connection 111, in respect of a conveying stream, from the article receiving area 101 into the article storage 105 and, independently thereof, an optional second bypass connection 112, in respect of a conveying stream, from the hanging bag sorting device 103 into the picking station 106. Lastly, an article issue area conveyor system 113 leading away from the picking station 106 is also provided in FIG. 1.

Generally, the conveying stream connections in the storage and order-picking system 100a, i.e. in particular the article receiving conveyor system 107, the hanging bag conveyor system 108a, 108b, the storage conveyor system 109, the retrieval conveyor system 110, the first bypass connection 111, the second bypass connection 112 and/or the article issue conveyor system 113, may comprise a stationary conveying system and/or autonomous mobile robots.

A detailed representation of an exemplary storage and order-picking system 100a can be gathered from FIG. 4.

FIGS. 2 and 3 now show the basic process of the presented method for operating the storage and order-picking system 100a and/or of articles passing through the storage and order-picking system 100a.

In a step 201 or a) (predominantly) mixed articles, i.e. articles of different article types, are provided at the article receiving area 101 of the storage and order-picking system 100a.

Preferably, in a step 202, a check of whether the provided articles are article-specific is performed. If mixed (i.e. non-article-specific) articles are provided, they are loaded into hanging bags in a step 203 or b) in the first loading station 102. In this process, the hanging bags are loaded in an article-specific manner, meaning that a hanging bag is loaded with an article or with multiple articles of the same article type. Furthermore, the article type of the article(s) loaded into the hanging bag is acquired and the allocation, which hanging bag contains articles of which article type, is stored for later use. Preferably, one single article is loaded into each hanging bag in step 203 or b). Yet, it is also conceivable to load the hanging bags with a varying number of articles.

In a step 204 or c), the loaded hanging bags are transported into the hanging bag sorting device 103 (in short "sorter").

In a step 205 or d), groups of hanging bags are formed in the hanging bag sorting device 103 based on an article-grouping rule. The "article-grouping rule" allocates one or multiple specifiable article types to each group. Accordingly, a hanging bag group may comprise articles of a single specified article type or articles of multiple, specified article types. The article-grouping rule can be entered by the operator of the storage and order-picking system 100a and be acquired and processed by a control system of the storage and order-picking system 100a. The article-grouping rule can also be understood to mean a loading order for an article storage loading aid.

In an optional step 206, it is checked whether the dwell time of a hanging bag or of an article in the hanging bag sorting device reaches a dwell time threshold value SW1, and/or whether the dwell time of a group of hanging bags or articles of the hanging bag group in the hanging bag sorting device 103 reaches a dwell time threshold value SW1. If this is true, the relevant hanging bags are transported to the second loading station 104 in a step 208 or e), in order to prevent the hanging bags from remaining in the hanging bag sorting device 103 for too long. In particular, individual hanging bags, for which no partner can be found and which consequently do not belong to any group, are also transported to the second loading station 104. However, if the dwell time threshold value SW1 has not yet been reached, the attempt of forming a group and/or extending the group continues.

In a further optional step 207 independent of the above, it is checked whether the number of hanging bags of a group reaches a hanging bag group size threshold value SW2 or the number of articles in the hanging bags of a group reaches an article group size threshold value SW2'. If this is true, the relevant hanging bags are transported to the second loading station 104 in step 208 or e). However, if the hanging bag group size threshold value SW2 or the article group size threshold value SW2' has not yet been reached, the attempt of forming a group and/or extending it continues. Thus, the transport of groups, which are too small, to the second loading station 104 and a loss of efficiency of the presented method is to be prevented.

In a step 301 or f), the articles of a group contained in the hanging bag in an article-specific manner are transferred at the second loading station 104, from the hanging bags into an article storage loading aid, in short "article storage LA", which is configured differently from a hanging bag. Subsequently, the article storage loading aid with the transferred articles is stored in the article storage 105 in a step 302. In this regard, the transferring and storing is carried out without reference to a picking order.

In a step 303 or g), picking orders for picking ordered articles are acquired.

In an optional step 304, it is checked whether an ordered article to be picked is in stock in the hanging bag sorting device 103. If the ordered article to be picked is not in stock in the hanging bag sorting device 103, an article storage loading aid, which contains at least an ordered article allocated to the picking order, is retrieved, in a step 305 or h), from the article storage 105 by means of the retrieval conveyor system 110 and, in a step 306, is transported to the picking station 106. Subsequently, in a step 307, a target loading aid is loaded with the at least one ordered article at the picking station 106. Lastly, the articles are dispatched in a step 308. Of course, it is also conceivable that the target loading aid is interim-stored until being dispatched.

If the ordered article to be picked is in stock in the hanging bag sorting device 103, the hanging bag is retrieved from the hanging bag sorting device 103 in a step 309, and is transported to the picking station 106 in a step 310 using the second bypass connection 112. Subsequently, in a step 307, a target loading aid is loaded again with the at least one ordered article at the picking station 106. Lastly, the articles are dispatched in the same way in step 308. Of course, it is again also conceivable that the target loading aid is interim-stored until being dispatched.

At this point, it should be noted that a picking order can be assembled using articles exclusively from the hanging bag sorting device 103, using articles exclusively from the article storage 105, or mixed, using articles from the hanging bag sorting device 103 and with articles from the article storage 105. For the sake of completeness, it is also noted that after being loaded, a target loading aid may contain both articles from the hanging bag sorting device 103 and articles from the article storage 105.

It is also conceivable that steps 304, 309 and 310 are omitted, and picking orders can generally be assembled using articles from the article storage 105.

The flowchart shown in FIGS. 2 and 3 also comprises an optional connection from step 202 to step 302. This is advantageous if step 201 or a) also comprises providing (an) article(s) at the article receiving area 101 of the storage and order-picking system 100a, which is/are provided in an article-specific manner by means of a delivery loading aid, and storing said article(s) in the article storage 105 while bypassing steps 203 to 301 and/or while bypassing steps b) to f), and without reference to a picking order. In this regard, the delivery loading aid can be stored directly in the article storage 105 without the help of the first bypass connection 111. Alternatively, the mentioned article(s) may be transferred at the second loading station 104 or at a third loading station, from the delivery loading aid into an article storage loading aid, whereupon the loaded article storage loading aid is stored in the article storage 105.

Generally, an article storage loading aid or a compartment of a (compartmentalized) article storage loading aid can be loaded, in step 301 or f), with articles of a single article type, thus in an article-specific manner. Yet, it is also conceivable that an article storage loading aid or a compartment of a (compartmentalized) article storage loading aid is loaded, in step 301 or f), with articles of multiple specified article types, thus in a mixed manner. In the case of a mixed load, it is advantageous if a volume of a first article of a first article type is at least twice the volume of a second article of a second article type, and/or
  a weight of a first article of a first article type is at least twice the weight of a second article of a second article type, and/or
  a longest dimension of a first article of a first article type is at least twice the longest dimension of a second article of a second article type, and/or
  an optical degree of reflection of a first article of a first article type is at least twice the degree of reflection of a second article of a second article type, and/or
  a color of a first article of a first article type, is at least 30° removed in a color wheel (in particular in a color wheel according to Itten) from a color of a second article of a second article type.

This way, the articles contained mixed in the article storage loading aids can be distinguished well by a person or also by an optical image capturing system of a robot. Consequently, a target loading aid can be loaded automatically with a very low error rate in step 307, even if the article storage loading aids are loaded in a mixed manner. Automatic loading of a target loading aid is disclosed, for example, in WO 2018/132855 A1. This means that an article of an incorrect article type is rarely or never loaded into the target loading aid. When the article storage loading aid is loaded in an article-specific manner, incorrect loading of the target loading aid is practically precluded anyway.

In an entirely similar way, hanging bag groups can be formed. As mentioned before, in step 205 or d), groups of hanging bags can be formed with articles of the same article type or with articles of different article types. If hanging bag groups are formed with articles of different article types, it is advantageous if a volume of a first article of a first article type is at least twice the volume of a second article of a second article type, and/or a weight of a first article of a first article type is at least twice the weight of a second article of a second article type, and/or a longest dimension of a first article of a first article type is at least twice the longest dimension of a second article of a second article type, and/or an optical degree of reflection of a first article of a first article type is at least twice the degree of reflection of a second article of a second article type, and/or a color of a first article of a first article type, is at least 30° removed in a color wheel (in particular in a color wheel according to Itten) from a color of a second article of a second article type.

This way, the articles contained in the hanging bags of a hanging bag group can be distinguished well by a person or also by a robot. Consequently, an article storage loading aid can be loaded, in step 301, and/or a target loading aid can be loaded, in step 307, with a very low error rate, even if the hanging bags of a hanging bag contain articles of multiple article types. This means that an article of an incorrect article type is rarely or never loaded in the article storage loading aid or target loading aid. If the hanging bags of a hanging bag group contain articles of a single article type, incorrect loading of an article type loading aid or of a target loading aid is practically precluded anyway.

If hanging bag groups are formed with articles of different article types, it is further advantageous if, after step 205 or d), the hanging bags of a group are present in blocks sorted with respect to the article type of the articles contained therein. Within a group, a block with articles of a first article type is then followed by a block with articles of a second article type and so on. This way, article storage loading aids can be loaded in step 301 easily and efficiently in an article-specific manner, even if hanging bag groups comprise articles of different article types. Of course, a block may also be considered an independent hanging bag group.

However, is also conceivable that after step 205 or d), the hanging bags of a group are chaotically distributed with respect to the article type of the articles contained therein. This means that, in this case, the blocks are not necessarily formed of the same article type. The sorting effort for forming a group can thus be kept low.

The presented method is particularly suitable for storing and/or return storing return articles, which are usually mixed and provided at the article receiving area 101 in low quantities per article type. It is therefore advantageous if only return articles are loaded in the hanging bags and are treated according to steps 203 to 308 and/or according to steps b) to h).

It is also advantageous if no less than 10% of the hanging bags, which pass through the hanging bag sorting device 103 or are in stock in the hanging bag sorting device 103, are allocated to a group in step 205 d). This way, the storage and order-picking system 100 can be operated particularly efficiently.

FIG. 4 shows a slightly more detailed representation of the exemplary storage and order-picking system 100a.

Specifically, the first loading station 102, the hanging bag sorting device 103, the second loading station 104, the article storage 105 and the picking station 106 are accommodated in a building 401. The article receiving area 101 itself is part of the building 401 in the form of an opening in the building.

The first loading station 102 may comprise a first robot 402a, a first provisioning position on a conveyor 403 of the article receiving conveyor system 107 and a second provisioning position on an overhead conveying track 404 on the first section 108a of the hanging bag conveyor system. On the conveyor 403 of the article receiving conveyor system 107, multiple articles 405a . . . 405d are arranged by way of example. In this regard, the articles 405c and 405d lie in a delivery loading aid 406a, the articles 405a and 405b lie loose (meaning without a delivery loading aid 406a) on the conveyor 403. The conveyor 403 of the article receiving area conveyor system 107 leads from the article receiving area 101 to the first robot 402a, and the overhead conveying track 404 on the first section 108a of the hanging bag conveyor system leads from the first robot 402a to the hanging bag sorting device 103.

The hanging bag sorting device 103 comprises multiple sorting tracks 407, in which some hanging bags 408a . . . 408c are depicted by way of example. In this regard, the hanging bag 408c is drawn rotated by 90° into the drawing plane to be able to show the article 405e stored therein. Of course, in reality, the hanging bag 408c hangs downward like the hanging bag 408a, 408b. An overhead conveying track 409 on the second section 108b of the hanging bag conveyor system leads from the hanging bag sorting device 103 to the second loading station 104. The second loading station 104 may comprise a second robot 402b, a first provisioning position on the overhead conveying track 409 on the second section 108b of the hanging bag conveyor system and a second provisioning position on a conveyor 410 of the storage conveyor system 109, wherein the latter leads from the second root 402b of the second loading station 104 to the article storage 105.

In the example shown, a hanging bag 408d with an article 405f stored therein is situated at the first provisioning position of the second loading station 104. Like the hanging bag 408c, the hanging bag 408d is also drawn rotated into the drawing plane for better depictability. In the example shown, an article storage loading aid 411a with an article 405g stored therein is situated at the second provisioning position of the second loading station 104.

In this example, the article storage 105 comprises multiple storage racks 412, each with multiple storage places, as well as storage and retrieval devices 413a and 413b, which travel in the rack aisles extending between the storage racks 412. At that end of the rack aisles, which lies opposite the storage conveyor system 109, two conveyors 414a, 414b of the retrieval conveyor system 110 are arranged, which lead from the article storage 105 to a picking station 106.

The picking station 106 may comprise a third robot 402c, a first provisioning position on the first conveyor 414a of the retrieval conveyor system 110, a second provisioning position on the second conveyor 414b of the retrieval conveyor system 110, and a third provisioning position on a conveyor 415 of the article issue conveyor system 113, wherein the latter connects the third robot 402c to an article issue area point 416.

In this example, a second article storage loading aid 411b is located at the second provisioning position on the second conveyor 414b of the retrieval conveyor system 110, and, in this example, a target loading aid 417 with two articles 405h, 405i stored therein is located at the third supply position on the conveyor 415 of the article issue conveyor system 113.

Moreover, multiple autonomous mobile robots 418a . . . 418d with delivery loading aids 406b . . . 406d transported thereon are present in the storage and order-picking system 100a shown in FIG. 4. At the moment depicted in FIG. 4, the autonomous mobile robots 418a . . . 418d are part of the first bypass connection 111 between the first loading station 102 and the article storage 105. Specifically, in this regard, the autonomous mobile robots 418a and 418b are situated between the first loading station 102 and the second loading station 104, and the autonomous mobile robots 418c and 418d are situated between the first loading station 102 and the picking station 106. Lastly, FIG. 4 also shows a conveying track of the second bypass connection 112, which connects the hanging bag sorting device 103 to the picking station 106.

The functioning of the storage and order-picking system 100a shown in FIG. 4 is equal to the functioning shown in FIGS. 2 and 3 of the storage and order-picking system 100 shown in FIG. 1 and is thus only summarized briefly.

In step 201 or a), (predominantly) mixed articles 405a . . . 405d are provided at the article receiving area 101 of the storage and order-picking system 100a, discharged onto the conveyor 403 of the article receiving conveyor system 107 and provisioned at the first provisioning position of the first loading station 102. At the second provisioning position of the first loading station 102, an (empty) hanging bag 408a . . . 408c is provisioned. Subsequently, the articles 405a . . . 405d are picked by the robot 402a from the conveyor 403 of the article receiving conveyor system 107 or from the delivery loading aid 406a, and are loaded into the provisioned hanging bag 408a . . . 408c in an article-specific manner. Preferably, each hanging bag 408a . . . 408c is loaded with one single article 405a . . . 405d. Yet, it is also conceivable to load the hanging bag 408a . . . 408c with a varying number of articles 405a . . . 405d. The article type of the article 405a . . . 405d loaded in the hanging bag 408a . . . 408c is acquired and the allocation, which hanging bag 408a . . . 408c contains articles 405a . . . 405d of which article type, is stored for later use.

In step 204 or c), the loaded hanging bags 408a . . . 408c are transported into the hanging bag sorting device 103 and in step 205 or d), groups of hanging bags 408a . . . 408c are formed in the hanging bag sorting device 103 in the manner described above, based on an article-grouping rule.

Retrieving a hanging bag group from the hanging bag sorting device 103 and transporting the hanging bag group to the second loading station 104 in step 208 or e) may be initiated in the optional step 206 (check of dwell time) or in the optional step 207 (size of a hanging bag group).

In step 301 or f), the articles 405a . . . 405f of one group contained in the hanging bags 408a . . . 408d in an article-specific manner are transferred by the second robot 402b of the second loading station 104, from the hanging bags 408a . . . 408d into an article storage loading aid 411a, 411b. For this purpose, a loaded hanging bag 408a . . . 408d is provisioned at the first provisioning position of the second loading station 104, and an article storage loading aid 411a, 411b is provisioned at the second provisioning position of the second loading station 104. Subsequently, in step 302, the article storage loading aid 411a, 411b is stored, with the transferred articles 405a . . . 405g, in the article storage 105. For this purpose, the article storage loading aid 411a, 411b is transported by the conveyor 410 of the storage conveyor system 109 to one of the two storage and retrieval devices 413a, 413b, taken over by it and stored in the storage rack 412.

If, in step 303 or g), a picking order for picking ordered articles is acquired, an article storage loading aid 411a, 411b, which contains at least an ordered article 405i, 405h allocated to the picking order, is retrieved from the storage rack 412 in step 305 by one of the two storage and retrieval devices 413a, 413b and transferred to the corresponding conveyor 414a, 414b of the retrieval conveyor system 110. The ordered article 405i, 405h is transported to the first or second provisioning position of the picking station 106 by the conveyor 414a, 414b of the retrieval conveyor system 110 and provisioned there. At the third provisioning position of the picking station 106, a target loading aid 417 is provisioned. Subsequently, in step 307, the ordered articles 405i, 405h allocated to the picking order are loaded from the article storage loading aid 411a, 411b into the target loading aid 417 by means of the third robot 402c.

Lastly, in step 308, the articles are dispatched by the loaded target loading aid 417 being conveyed to the article issue area 416 by the conveyor 415 of the article issue conveyor system 113 and transported away from there. Of course, it is also conceivable that the target loading aid 417 is interim-stored in a storage zone not shown until being dispatched.

The flowchart shown in FIGS. 2 and 3 contains two optional steps 202 and 304, which may also be applied in the storage and order-picking system shown in FIG. 4.

In the optional step 202, it can be checked whether the provided articles 405a . . . 405d are article-specific. If mixed (meaning non-article-specific) articles 405a . . . 405d are provided, it is stored in the article storage 105 in the manner described above. If, however, articles 405a . . . 405d are provided by means of a delivery loading aid 406a . . . 406d in an article-specific manner, these articles 405a . . . 405d may be stored in the article storage 105 while bypassing steps 203 to 301 and/or while bypassing steps b) to f).

For this purpose, the delivery loading aids 406b, 406c may be transported, by means of the autonomous mobile robots 418a, 418b, directly to the second loading station 104 via the first bypass connection 111 and be provisioned there without passing through the hanging bag sorting device 103. There, the articles 405a . . . 405d are transferred, by the second robot 402b, into an article storage loading aid 405g provided at the second provisioning position and stored in the article storage 105 in the manner described above. It would also be conceivable that the delivery loading aid 406b, 406c with the articles 405a . . . 405d is directly stored in the article storage 105, i.e. without the articles 405a . . . 405d being transferred into an article storage loading aid 405g. For this purpose, the autonomous mobile robot 418a, 418b can also head for a special provisioning position at the article storage 105 (not shown).

It would also be possible that a delivery loading aid 406b, 406d may be transported, by means of the autonomous mobile robot 418c, directly to the picking station 106 via the first bypass connection 111 and be provisioned there without passing through the hanging bag sorting device 103. There, the articles 405a . . . 405d are transferred, by the third robot 402c, into an article storage loading aid 405g provided at the first or second provisioning position and stored in the article storage 105 by means of the retrieval conveyor system 110 and the storage and retrieval devices 413a, 413b. For this purpose, the retrieval conveyor system 110 is operated in the reverse direction (reversing operation).

In this case, it would also be conceivable that the delivery loading aid 406d with the articles 405a . . . 405d is directly stored in the article storage 105, i.e. without the articles 405a . . . 405d being transferred into an article storage loading aid 405g. For this purpose, the autonomous mobile robot 418c can again head for a special provisioning position at the article storage 105 (not shown).

In the optional step 304, it can also be checked whether an ordered article 405h to be picked is in stock in the hanging bag sorting device 103. If the ordered article 405*i*, 405*h* to be picked is not in stock in the hanging bag sorting device 103, it is provided at the picking station 106 in the manner described above.

However, if the ordered article 405*i*, 405*h* to be picked is in stock in the hanging bag sorting device 103, the hanging bag 408*a* . . . 408*d* can be retrieved from the hanging bag sorting device 103 in step 309, and be transported to the picking station 106 in step 310 using the second bypass connection 112 and be provisioned there. In step 307, the ordered articles 405*i*, 405*h* are removed, by the third robot 402*c*, from the hanging bag 408*a* . . . 408*d* provisioned at the picking station 106 and discharged into the target loading aid 417 provided on the conveyor 415 of the article issue conveyor system 113, which target loading aid 417 can subsequently be dispatched in the manner described above.

Thus, a picking order can be assembled using articles 405*e*, 405*f* exclusively from the hanging bag sorting device 103, using articles 405*i*, 405*h* exclusively from the article storage 105, or mixed, using articles 405*e*, 405*f* from the hanging bag sorting device 103 and with articles 405*i*, 405*h* from the article storage 105. After loading, the target loading aid 417 can thus contain both articles 405*e*, 405*f* from the hanging bag sorting device 103 and articles 405*i*, 405*h* from the article storage 105.

If the hanging bag groups are formed with articles 405*a* . . . 405*f* of different article types, it is advantageous if the article types are different in the manner described above. Thereby, loading of an article storage loading aid 411*a*, 411*b* in step 301 by means of the second robot 402*b* or also by a person and/or loading a target loading aid in step 307 by means of the third robot 402*c* or also by a person may be carried out with a very low error rate, even if the hanging bags 408*a* . . . 408*d* of a hanging bag group contain articles 405*a* . . . 405*f* of multiple article types. As mentioned before, articles 405*a* . . . 405*f* of multiple article types in a hanging bag group may be chaotically distributed or present sorted in blocks.

If the article storage loading aids 411*a*, 411*b* are loaded with articles 405*a* . . . 405*f* of different article types, it is also advantageous if the article types are different in the manner described above. Thereby, loading a target loading aid 417 in step 307 by means of the third robot 402*c* or also by a person may be carried out with a very low error rate, even if the article storage loading aids 411*a*, 411*b* contain articles 405*a* . . . 405*f* of multiple article types.

The remaining aspects not explicitly mentioned regarding FIG. 4 and the advantages resulting therefrom can be taken from the description regarding FIGS. 1 to 3.

At this point, it should also be mentioned, that the process described in FIGS. 2 to 4 is controlled by a control system 419 of the storage and order-picking system 100*a*.

The control system 419 is consequently configured to
i) acquire an article type of an article 405*a* . . . 405*f* loaded in a hanging bag 408*a* . . . 408*d*,
ii) control the hanging bag sorting device 103 for forming groups of hanging bags 408*a* . . . 408*d* based on an article-grouping rule, which allocates one or multiple specifiable article types to each group,
iii) trigger the transferring of the articles contained in the hanging bags from the hanging bags into the article storage loading aid and the storing of the article storage loading aids into the article storage by means of the storage conveyor system without reference to a picking order,
iv) acquire picking orders for picking ordered articles 405*i*, 405*h*, and
v) process a picking order, wherein the process of the picking order comprises
triggering the retrieval of an article storage loading aid 411*a*, 411*b*, which contains at least an ordered article 405*i*, 405*h* allocated to the picking order, from the article storage 105 by means of the retrieval conveyor system 110, and
controlling the loading of a target loading aid 417 with the at least one ordered article 405*i*, 405*h* at a picking station 106.

The control system 419 thus controls the elements of the conveying system of the storage and order-picking system 100*a*. This includes in particular the article receiving conveyor system 107, the hanging bag conveyor system 108*a*, 108*b*, the storage conveyor system 109, the retrieval conveyor system 110, the first bypass connection 111, the second bypass connection 112 and the article issue conveyor system 113. Furthermore, the control system 419 controls the robots 402*a* . . . 402*c*, the storage and retrieval devices 413*a*, 413*b* and the autonomous mobile robots 418*a* . . . 418*d*.

The control system 419 is shown in FIG. 4 merely symbolically and may comprise one control or multiple controls, in particular also the travel controls of the autonomous mobile robots 418*a* . . . 418*d*.

In the example shown in FIG. 4, the article receiving conveyor system 107, the hanging bag conveyor system 108*a*, 108*b*, the storage conveyor system 109, the retrieval conveyor system 110, the second bypass connection 112, and the article issue conveyor system 113 are formed by a stationary conveying system, whereas the first bypass connection 111 is formed by the autonomous mobile robots 418*a* . . . 418*d*. This is not an obligatory requirement but the conditions may also be reversed and mixed. In particular, it is also conceivable that the autonomous mobile robots 418*a* . . . 418*d* can travel into the rack aisles between the storage racks 412 and (additionally or alternatively) assume the function of the storage and retrieval devices 413*a*, 413*b*.

FIG. 5 shows a possible embodiment of an autonomous mobile robots 418 ("automated guided vehicle", in short "AGV"). The autonomous mobile robot 418 comprises a chassis 501 having a drive unit and a loading platform 502 arranged on the chassis 501 for receiving, discharging and transporting an article 405*a* . . . 405*i* (not shown in FIG. 5) or of a first delivery loading aid 406*a* . . . 406*d*, article storage loading aid 411*a*, 411*b* or target loading aid 417 (also not shown in FIG. 5). It would also be conceivable that the autonomous mobile robot 418 additionally or alternatively comprises a suspension rod, with which hanging bags 408*a* . . . 408*d* can be transported.

The drive unit comprises wheels 503, 504 rotatably mounted on the chassis 501, of which at least one of the wheels 503 is coupled with a drive (not depicted) and at least one of the wheels 504 can be steered. It is also possible for both wheels 503, 504 to be coupled with the drive and to be driven by it. However, the autonomous mobile robot 418 may also comprise four wheels, of which two wheels can be steered. According to the embodiment shown, the loading platform 502 is mounted on the chassis 501 so as to be adjustable between an initial position (represented in continuous lines) and a transport position (represented in dashed lines).

In the starting position, an article 405*a* . . . 405*i* or a delivery loading aid 406*a* . . . 406*d*, article storage loading aid 411*a*, 411*b* or target loading aid 417 can be driven under in order to be received. If the loading platform 502 is adjusted out of the starting position in the direction of the transport position, the article 405*a* . . . 405*i* or the delivery loading aid 406*a* . . . 406*d*, article storage loading aid 411*a*, 411*b* or target loading aid 417 can be lifted and subsequently transported. If the loading platform 502 is adjusted out of the transport position back in the direction of the starting position, the article 405*a* . . . 405*i* or the delivery loading aid 406*a* . . . 406*d*, article storage loading aid 411*a*, 411*b* or target loading aid 417 can be parked again or be discharged.

The autonomous mobile robot 418 further comprises a travel control 505, represented schematically in dashed lines, for receiving commands from a superordinate main computer and for controlling/regulating the movements of the autonomous mobile robot 418. The travel control 505 may also comprise means for (wirelessly) transfer data to and from the autonomous mobile robot 418. Finally, the autonomous mobile robot 418 comprises sensors, which are not shown, for detecting the environment of the autonomous mobile robot 418 and for spatial orientation. The drive of the drive unit and the sensors are connected to the travel control 505.

In the previous examples, the article storage 105 is specifically configured as a lying article article storage, the articles 405*a* . . . 405*i* are specifically lying articles, and the article storage loading aids 411*a*, 411*b* are specifically configured as article storage lying article loading aids. However, this is not the only conceivable possibility, as is illustrated with the aid of the following example.

FIG. 6 shows a storage and order-picking system 100*b*, which is configured similar to the storage and order-picking system 100*a* depicted in FIG. 4. In contrast to this, however, the storage and order-picking system 100*b* comprises a hanging article article storage 601 in addition to the lying article article storage 105. Furthermore, the storage conveyor system 109 comprises an overhead conveying track 602 of the storage conveyor system 109, which connects the second loading station 104 to the hanging article article storage 601, and the retrieval conveyor system 110 comprises an overhead conveying track 603 of the retrieval conveyor system 110, which connects the hanging article article storage 601 to the picking station 106. Accordingly, the conveyor 410 of the storage conveyor system 109 leads only to the right part of the warehouse, namely to the lying article article storage 105, and the conveyor 414*a* of the retrieval conveyor system 106 is omitted.

FIG. 6 additionally shows a further hanging bag 408*e* in the region of the hanging bag sorting device 103 and another further hanging bag 408*f* in the region of the overhead conveying track 602 of the storage conveyor system 109. A hanging article 604*a* is hung on a hook on the hanging bag 408*e*. The embodiment of hanging bag 408*e* can therefore also transport hanging articles. Either the hanging article 604*a* is hung accommodated inside a storage space of the hanging bag 408*e* or the hanging article 604*a* is hung outside the storage space of the hanging bag 408*e*. Lastly, a further hanging article 604*b* is situated in the region of the hanging bag sorting device 103, which hanging article 604*b* is hung on a hanging article transport carrier not shown (however, see FIG. 10 in this context).

The functioning of the storage and order-picking system 100*b* depicted in FIG. 6 is as follows.

In a step a'), which is very similar to step a) or 201, hanging articles 604*a*, 604*b* are provided in addition to the lying articles 405*a* . . . 405*i* at the article receiving area 101 of the storage and order-picking system 100*b*. These may be different hanging articles 604*a*, 604*b*.

In a step b'), which is very similar to step b) or 203, the provided hanging articles 604*a*, 604*b* are loaded into or onto hanging bags 408*a* . . . 408*f* and/or onto hanging article transport carriers in an article-specific manner at the first loading station 102. In this process, an article type of the hanging articles 604*a*, 604*b* loaded in/on the hanging bag 408*a* . . . 408*f* and/or on the hanging article transport carrier is acquired. The article receiving conveyor system 107 is effectively not needed for step b'), however, the article receiving area conveyor system 107 may also comprise an overhead conveying track leading from the article receiving area 101 to the first loading station 102.

In a step c'), which is very similar to step c) or 204, the loaded hanging bags 408*a* . . . 408*f* and/or the loaded hanging article transport carriers are transported into the hanging bag sorting device 103 by means of the hanging bag conveyor system 108*a*.

In a step d'), which is very similar to step d) or 205, groups of hanging bags 408*a* . . . 408*f* and/or hanging article transport carriers are formed in the hanging bag sorting device 103 based on the article-grouping rule, which allocated one or multiple specifiable article types to each group.

In a step e'), which is very similar to step e) or 208, the groups of hanging bags 408*a* . . . 408*f* and/or the groups of hanging article transport carriers are transported to the second loading station 104 by means of the hanging bag conveyor system 108*b*.

In a step f'), which is very similar to step f) or 301, the hanging articles 604*a*, 604*b*, loaded in/on the hanging bag 408*a* . . . 408*f* and/or on the hanging article transport carrier, of a group of hanging bags 408*a* . . . 408*f* and/or of a group of hanging article transport carriers are loaded into/onto an article storage hanging article loading aid 411*a*, 411*b* at the second loading station 104. The article storage hanging article loading aid 411*a*, 411*b* may comprise a suspension rod, on which multiple hanging articles can be transported suspended at the same time. Subsequently, the article storage hanging article loading aid 411*a*, 411*b* is transported into the hanging article article storage 601 of the storage conveyor system 100*b* by means of the storage conveyor system 109 and stored there.

Storing the article storage hanging article loading aid 411*a*, 411*b* in a hanging article article storage 601 may comprise different substeps:

i) transporting the article storage hanging article loading aids 411*a*, 411*b* from the second loading station 104 to a hanging article loading aid provisioning station, providing the article storage hanging article loading aid 411*a*, 411*b* at the provisioning station, taking over the hanging articles 604*a*, 604*b* from the article storage hanging article loading aid 411*a*, 411*b* onto a storage and retrieval device (as described below), transporting the hanging articles 604*a*, 604*b* from the provisioning station to a storage zone of the hanging article article storage 601, positioning the storage and retrieval device in front of a storage overhead track (as described below) in the storage zone and displacing the hanging articles 604*a*, 604*b* from the storage and retrieval device onto the storage overhead track;

ii) transporting the article storage hanging article loading aid 411*a*, 411*b* from the second loading aid 104 directly into a storage zone of the hanging article article storage 601, and storing the article storage hanging article loading aid 411*a*, 411*b* in the storage zone.

In this regard, the transferring and storing is carried out without reference to a picking order.

In a step g'), which is very similar to step g) or 303, picking orders for picking ordered hanging articles 604a, 604b are acquired.

In a further step h'), which is very similar to step h) or 305, the picking order is ultimately processed. This comprises the steps retrieving an article storage hanging article loading aid 408a . . . 408f, which contains at least one ordered hanging article 604a, 604b allocated to the picking order, from the hanging article article storage 601 by means of the retrieval conveyor system 110, and loading a target loading aid 417 with the at least one ordered hanging article 604a, 604b at a picking station 106.

Retrieving the article storage hanging article loading aid 411a, 411b from a hanging article article storage 601 for a picking order may comprise different substeps:

i) displacing the hanging articles 604a, 604b from the corresponding storage overhead track onto the storage and retrieval device, transporting the hanging articles 604a, 604b to a hanging article loading aid provisioning station, providing an empty article storage hanging article loading aid 411a, 411b at the provisioning station, transferring the hanging articles 604a, 604b required for a picking order from the storage and retrieval device onto the empty article storage hanging article loading aid 411a, 411b, transporting the article storage hanging article loading aid 411a, 411b with the ordered hanging articles 604a, 604b to the picking station 106 by means of the retrieval conveyor system 110; or ii) transporting the article storage hanging article loading aids 411a, 411b with the ordered hanging articles 604a, 604b from the storage zone of the hanging article article storage 601 to the picking station 106 by means of the retrieval conveyor system 110. In this process, the article storage hanging article loading aid 411a, 411b can receive only the ordered hanging articles 604a, 604b required for a picking order and consequently, all ordered hanging articles 604a, 604b are removed at the picking station 106. Or, independent of the required number of hanging articles, the article storage hanging article loading aid 411a, 411b is transported to the picking station 106, and the ordered hanging articles 604a, 604b required for a picking order are removed there. If (a) hanging article(s) remains on the article storage hanging article loading aid 411a, 411b, it can be transported back into the storage zone.

The first bypass connection 111 and the second bypass connection 112 is also applicable analogously in the context of hanging articles 604a, 604b.

FIG. 7 shows an exemplary hanging article article storage 601 in an oblique view. Such an automated hanging article article storage 601 is described in WO 2017/060301 A2 and WO 2018/201176 A2. The hanging article article storage 601 comprises front shelf uprights 701, front longitudinal crossbeams 702 affixed thereon, rear shelf uprights 701, rear longitudinal crossbeams 702 affixed thereon and a plurality of suspension rods and/or storage overhead tracks 704, which extend between the front longitudinal crossbeams 702 and the rear longitudinal crossbeams 703 in storage planes located on top of each other and on which hanging bags 408 or hanging articles 604a, 604b can be hung. Additionally, the hanging article article storage 601 may comprise at least a storage and retrieval device 413a shown in an exemplary manner. If the storage and retrieval device 413a is a single-level storage and retrieval device, the front longitudinal crossbeams 702 can simultaneously serve as travel rails for the at least one storage and retrieval device 413a. According to this embodiment, the storage conveyor system 109 also comprises the at least one storage and retrieval device 413a.

FIGS. 8 and 9 show an oblique view of a storage and retrieval device 413a, which is configured to manipulate hanging bags 408 and/or hanging articles 604a, 604b. The storage and retrieval device 413a comprises a chassis 801, multiple wheels 802 rotatably mounted thereon, with which the storage and retrieval device 413a travels on the longitudinal crossbeams/travel rails 702, a suspension rod 803 and a telescoping unit 804, with which the hanging bags 408 or hanging articles 604a, 604b can be placed in storage from the suspension rod 803 of the storage and retrieval device 413a onto the storage overhead track 704, or can be retrieved from the storage overhead track 704 onto the suspension rod 803 of the storage and retrieval device 413a. In this regard, the telescoping unit 804 serves to displace the hanging bags 408 or hanging articles 604a, 604b on the suspension rod 803 of the storage and retrieval device 413a and on the storage overhead track 704. FIG. 8 shows the storage and retrieval device 413a in the travel position, meaning with a retracted telescoping unit 804, and FIG. 9 shows the storage and retrieval device 413a in a storage/retrieval position, meaning with an extended telescoping unit 804.

Alternatively, an automated hanging article article storage as described, for example in EP 1 972 577 that is not shown is also possible.

Even though the hanging article article storage 601 is designed as a fully automated hanging article article storage according to a preferred embodiment, a manually operated hanging article article storage would also be conceivable.

Lastly, FIG. 10 shows an exemplary hanging article transport carrier 1001 in an oblique view. The hanging article transport carrier 1001 may be moved in a driven and/or non-driven manner along the overhead conveying tracks 404, 409 of the hanging bag conveyor system 108a, 108b, the sorting tracks 407 of the hanging bag sorting device 103, the overhead conveying track 602 of the storage conveyor system 108, the overhead conveying track 603 of the retrieval conveyor system 110, on the storage overhead tracks 704 and/or on the suspension rod 803 of the storage and retrieval device 413a. The hanging article transport carrier 1001 may comprise a base body 1002 and one or multiple rollers 1003 rotatably mounted thereon. Moreover, the hanging article transport carrier 1001 may comprise an adapter receptacle 1004, into which a first suspension adapter 1005 or a second suspension adapter 1006 can optionally be inserted. A hanging article 604a, 604b can be hung on the first suspension adapter 1005 via a clothes hanger. The second suspension adapter 1006 is provided for a hanging bag 408 . . . 408f, on which suspension adapter 1006 the hanging bag 408 . . . 408f can be hung via a hanger. In principle, however, a hanging article 604a, 604b can also be hung on the second suspension adapter 1006.

The hanging article transport carrier 1001 is not limited to the design shown in FIG. 10 but could also be configured differently. In particular, the hanging article transport carrier 1001 may also be formed in one piece.

It should finally be noted that the scope of protection is determined by the patent claims. However, the description and the drawings are to be adduced for construing the claims. Individual features or feature combinations from the different exemplary embodiments shown and described may represent independent inventive solutions. The object underlying the independent inventive solutions may be gathered from the description. In particular, it should also be noted that the devices shown may in reality comprise more or fewer components than those shown. In some cases, the shown devices and/or their components may not be depicted to scale and/or be enlarged and/or reduced in size.

LIST OF REFERENCE NUMBERS

- 100a, 100b Storage and order-picking system
- 101 Article receiving area
- 102 First loading station
- 103 Hanging bag sorting device
- 104 Second loading station
- 105 Article storage (lying article article storage)
- 106 Picking station
- 107 Article receiving area conveyor system
- 108a, 108b Hanging bag conveyor system
- 109 Storage conveyor system
- 110 Retrieval conveyor system
- 111 First bypass connection
- 112 Second bypass connection
- 113 Article issue conveyor system
- 401 Building
- 402a . . . 402c Robot
- 403 Conveyor of the article receiving conveyor system
- 404 Overhead conveying track of the hanging bag conveyor system
- 405a . . . 405i Articles (lying articles)
- 406a . . . 406d Delivery loading aid
- 407 Sorting lane
- 408 . . . 408f Hanging bag
- 409 Overhead conveying track of the hanging bag conveyor system
- 410 Conveyor of the storage conveyor system
- 411a, 411b Article storage (lying articles) loading aid
- 412 Storage racks
- 413a, 413b Storage and retrieval device
- 414a, 414b Conveyor of the retrieval conveyor system
- 415 Conveyor of the article issue conveyor system
- 416 Article issue area
- 417 Target loading aid
- 418 . . . 418d Autonomous mobile robot
- 419 Control system
- 501 Chassis
- 502 Loading platform
- 503 Wheel (driven)
- 504 Wheel (steerable)
- 505 Drive control
- 601 Hanging article article storage
- 602 Overhead conveying track of the storage conveyor system
- 603 Overhead conveying track of the retrieval conveyor system
- 604a, 604b Hanging articles
- 701 Shelf uprights
- 702 Front longitudinal crossbeam (travel rail)
- 703 Rear longitudinal crossbeam
- 704 Suspension rod, overhead storage track
- 801 Chassis
- 802 Wheel
- 803 Suspension rod
- 804 Telescoping unit
- 1001 Hanging article transport carrier
- 1002 Base body
- 1003 Roller
- 1004 Adapter receptacle
- 1005 First suspension adapter
- 1006 Second suspension adapter

The invention claimed is:

1. A method for operating a storage and order-picking system, comprising the steps
    a) providing mixed articles at an article receiving area of the storage and order-picking system, wherein the articles comprise lying articles,
    b) loading hanging bags in an article-specific manner with the lying articles at a first loading station and acquiring article types of the lying articles loaded in the hanging bags,
    c) transporting the loaded hanging bags into a hanging bag sorting device by means of a hanging bag conveyor system,
    d) forming groups of hanging bags in the hanging bag sorting device based on an article-grouping rule, which allocates one or multiple specifiable article types to each group,
    e) transporting the groups of hanging bags to a second loading station by means of the hanging bag conveyor system,
    f) transferring the lying articles contained in the hanging bags in an article-specific manner of a group of hanging bags into an article storage lying article loading aid, which is comprised by article storage loading aids, at the second loading station, and storing the article storage lying article loading aid in a lying article article storage, which is comprised by an article storage of the storage and order-picking system, by means of a storage conveyor system, wherein transferring and storing takes place without reference to a picking order and wherein the article storage lying article loading aid is configured differently from a hanging bag,
    g) acquiring picking orders for picking ordered lying articles, which are comprised by ordered articles, and
    h) processing a picking order comprising the steps
        retrieving an article storage lying article loading aid, which contains at least one ordered lying article allocated to the picking order, from the lying article article storage by means of a retrieval conveyor system, and
        loading a target loading aid with the at least one ordered lying article at a picking station.

2. The method according to claim 1, additionally comprising the steps
    a') providing mixed articles at the article receiving area of the storage and order-picking system, wherein the articles also comprises mixed hanging articles,
    b') loading hanging bags and/or hanging article transport carriers with the hanging article types in an article-specific manner at the first loading station, and acquiring an article types of the hanging articles loaded in/on the hanging bag and/or on the hanging bags article transport carriers,
    c') transporting the loaded hanging bags and/or the loaded hanging article transport carriers into the hanging bag sorting device by means of the hanging bag conveyor system,
    d') forming groups of hanging bags and/or hanging article transport carriers in the hanging bag sorting device based on the article-grouping rule, which allocates one or multiple specifiable article types to each group, e') transporting the groups of hanging bags and/or the groups of hanging article transport carriers to the second loading station by means of the hanging bag conveyor system, f') transferring the hanging articles loaded into/onto the hanging bags and/or on the hanging article transport carriers, of a group of hanging bags and/or hanging article transport carriers into/onto an article storage hanging article loading aid, which is comprised by the article storage loading aids, at the second loading station, and storing the article storage hanging article loading aid in the hanging article article storage, which is comprised by the article storage of the storage and order-picking system, by means of the storage conveyor system, wherein transferring and storing takes place without reference to a picking order, g') acquiring picking orders for picking ordered hanging articles, which are comprised by the ordered articles, and h') processing a picking order comprising the steps of
retrieving an article storage hanging article loading aid, which contains at least one ordered hanging article allocated to the picking order, from the hanging article article storage, by means of the retrieval conveyor system, and
loading a target loading aid with the at least one ordered hanging article at a picking station.

3. The method according to claim 1, wherein steps e) and f) are carried out when the number of hanging bags of a group reaches a hanging bag group size threshold value or the number of articles in the hanging bags of a group reaches an article group size threshold value.

4. The method according to claim 1, wherein steps e) and f) are carried out when the dwell time of hanging bags or articles in the hanging bag sorting device reaches a dwell time threshold value.

5. The method according to claim 1, wherein exclusively return articles are loaded in the hanging bags and are treated according to steps b) to h).

6. The method according to claim 1, wherein step a) also comprises providing articles at the article receiving area of the storage and order-picking system, which are provided in an article-specific manner by means of a delivery loading aid, and storing the articles in the article storage is done while bypassing steps b) to f) and without reference to a picking order, wherein
the mentioned delivery loading aid is stored directly in the article storage, or
the articles are transferred, at the second loading station or at a third loading station, from the delivery loading aid into an article storage loading aid, and the loaded article storage loading aid is stored in the article storage.

7. The method according to claim 1, wherein in step b), one single article is loaded into each hanging bag.

8. The method according to claim 1, wherein exactly one specifiable article type is allocated to the group by the article-grouping rule, and the groups of hanging bags are formed with articles of the same article type.

9. The method according to claim 1, wherein multiple specifiable article types are allocated to the hanging bag group by the article-grouping rule, and the groups of hanging bags are formed with articles of different article types, wherein
a volume of a first article of a first article type is at least twice the volume of a second article of a second article type, and/or
a weight of a first article of a first article type is at least twice the weight of a second article of a second article type, and/or
a longest dimension of a first article of a first article type is at least twice the longest dimension of a second article of a second article type, and/or
an optical degree of reflection of a first article of a first article type is at least twice the degree of reflection of a second article of a second article type, and/or
a color of a first article of a first article type, is at least 30° removed in a color wheel from a color of a second article of a second article type.

10. The method according to claim 9, wherein after step d), the hanging bags of a group are present in blocks sorted with respect to the article type of the articles contained therein.

11. The method according to claim 9, wherein after step d), the hanging bags of a group are chaotically distributed with respect to the article type of the articles contained therein.

12. The method according to claim 1, wherein in step f), the article storage loading aids are loaded with articles of one article type in an article-specific manner at the second loading station.

13. The method according to claim 1, wherein in step f), the article storage loading aids are loaded with articles of different article types at the second loading station, wherein
a volume of a first article of a first article type is at least twice the volume of a second article of a second article type, and/or
a weight of a first article of a first article type is at least twice the weight of a second article of a second article type, and/or
a longest dimension of a first article of a first article type is at least twice the longest dimension of a second article of a second article type, and/or
an optical degree of reflection of a first article of a first article type is at least twice the degree of reflection of a second article of a second article type, and/or
a color of a first article of a first article type, is at least 30° removed in a color wheel from a color of a second article of a second article type.

14. The method according to claim 1, wherein in step g), it is checked whether an ordered article to be picked is in stock in the hanging bag sorting device and, upon a positive result of the check, instead of step h), for processing a picking order,
a hanging bag, which contains at least an ordered article allocated to the picking order, is retrieved from the hanging bag sorting device by means of a hanging bag conveyor system, and
a target loading aid is loaded at the picking station with the at least an ordered article.

15. A storage and order-picking system, comprising
an article receiving area for providing mixed articles, wherein the articles comprise lying articles,
a lying article storage provided downstream of the article receiving area in respect of a conveying stream, which is comprised by an article storage of the storage and order-picking system,
a picking station provided downstream of the lying article article storage in respect of a conveying stream, which is connected, to the lying article article storage via a retrieval conveyor system,
a first loading station, which is configured to load hanging bags with the lying articles in an article-specific manner, a hanging bag sorting device for the hanging bags provided downstream of the first loading station in respect of a conveying stream, which is connected, to the first loading station via a hanging bag conveyor system, a second loading station, the second loading station being provided downstream of the hanging bag sorting device in respect of a conveying stream and upstream of the lying article article storage in respect of a conveying stream, the second loading station being connected to the hanging bag sorting device via the hanging bag conveyor system, the second loading station being connected, to the lying article article storage via a storage conveyor system, and the second loading station being configured to transfer the lying articles contained in the hanging bags in an article-specific manner from the hanging bags into an article storage lying article loading aid, wherein the article storage lying article loading aid (is comprised by article storage loading aids and is configured differently from a hanging bag, and a control system configured to i) acquire an article type of a lying article loaded in a hanging bag, and ii) control the hanging bag sorting device for forming groups of hanging bags based on an article-grouping rule, which allocates one or multiple specifiable article types to each group, iii) trigger the transferring of the lying articles contained in the hanging bags from the hanging bags into the article storage lying article loading aid and the storing of the article storage lying article loading aids into the lying article article storage by means of the storage conveyor system without reference to a picking order, and iv) acquire picking orders for picking ordered lying articles, which are comprised by ordered articles, and v) process a picking order, wherein the process of the picking order comprises triggering the retrieval of an article storage lying article loading aid, which contains at least one ordered lying article allocated to the picking order, from the lying article article storage by means of the retrieval conveyor system (110), and controlling the loading of a target loading aid with the at least one ordered lying article at a picking station.

16. The storage and order-picking system according to claim 15, wherein the article receiving area is configured to provide mixed articles, which also comprise hanging articles, a hanging article article storage provided downstream of the article receiving area in respect of a conveying stream is provided, which is comprised by the article storage of the storage and order-picking system, the picking station is provided downstream of the hanging article article storage in respect of a conveying stream and connected to the hanging article article storage via a retrieval conveyor system, the first loading station is configured to load hanging bags and/or hanging article transport carriers with the hanging articles in an article-specific manner, the hanging bag sorting device is also configured to transport hanging article transport carriers, the second loading station is provided upstream of the hanging article article storage in respect of a conveying stream and connected to the hanging article article storage via the storage conveyor system, wherein the second loading station is also configured to transfer the hanging articles loaded in the hanging bags and/or on the hanging article transport carriers in an article-specific manner from the hanging bags and/or the hanging article transport carriers into/onto an article storage hanging article loading aid, and wherein the article storage hanging article loading aid is comprised by article storage loading aids, and the control system is also configured to i) acquire an article type of a hanging article loaded in/on the hanging bag and/or on the hanging article transport carrier, and ii) control the hanging bag sorting device for forming groups of hanging bags and/or hanging article transport carriers based on an article-grouping rule, which allocates one or more specifiable article types to each group, and iii) trigger the transferring of the hanging articles loaded in/on the hanging bags and/or on the hanging article transport carriers from the hanging bags and/or from the hanging article transport carriers into/onto an article storage hanging article loading aid and the storing of the article storage hanging article loading aid into the hanging article article storage by means of the storage conveyor system without reference to a picking order, iv) acquire picking orders for picking ordered hanging articles, which are comprised by ordered articles, and v) process a picking order, wherein the process of the picking order comprises triggering the retrieval of an article storage hanging article loading aid, which contains at least one ordered hanging article allocated to the picking order, from the hanging article article storage by means of the retrieval conveyor system, and controlling the loading of a target loading aid with the at least one ordered hanging article at a picking station.

17. The storage and order-picking system according to claim 15, wherein the hanging bag conveyor system and/or the storage and order-picking system and/or the retrieval conveyor system comprises a stationary conveying system and/or autonomous mobile robots.

\* \* \* \* \*